United States Patent
Mathews et al.

(10) Patent No.: US 10,571,877 B2
(45) Date of Patent: *Feb. 25, 2020

(54) SYSTEMS AND METHODS FOR PROGRAMMING AND CONTROLLING DEVICES WITH SENSOR DATA AND LEARNING

(71) Applicant: GOOGLE LLC, Mountain View, CA (US)

(72) Inventors: Jeffrey P. Mathews, Longmont, CO (US); Lee R. Taylor, Boulder, CO (US); Andrew J. Zimmer, Boulder, CO (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/144,638

(22) Filed: Sep. 27, 2018

(65) Prior Publication Data

US 2019/0025782 A1    Jan. 24, 2019

Related U.S. Application Data

(63) Continuation of application No. 14/581,994, filed on Dec. 23, 2014, now Pat. No. 10,088,818.

(60) Provisional application No. 61/919,893, filed on Dec. 23, 2013.

(51) Int. Cl.
G05B 15/02    (2006.01)
H04L 12/28    (2006.01)

(52) U.S. Cl.
CPC ............ *G05B 15/02* (2013.01); *H04L 12/282* (2013.01)

(58) Field of Classification Search
CPC .............................. G05B 15/02; H04L 12/282
See application file for complete search history.

(56) References Cited

U.S. PATENT DOCUMENTS

| 4,049,973 A | 9/1977 | Lambert |
| 4,393,342 A | 7/1983 | Matsuoka et al. |
| 5,838,226 A | 11/1998 | Houggy |

(Continued)

OTHER PUBLICATIONS

Detailed Technical Specification of Security for Heterogeneous Access, May 31, 2002, 161 pgs, www.isrc.rhul.ac.uk/shaman/docs/d09v1.pdf.

(Continued)

*Primary Examiner* — Christopher E. Everett
(74) *Attorney, Agent, or Firm* — Morgan, Lewis & Bockius LLP

(57) ABSTRACT

The various implementations described herein include methods, devices, and systems for programming and controlling devices with sensor data and learning. In one aspect, a method is performed at a system having electronic devices. The system includes processors and memory. The system determines a usage pattern of the electronic devices for each of a plurality of known users within a premise. For each of a plurality of first users of the known users, the system determines a correlation factor of the usage pattern. The correlation factor includes a state of a plurality of states of the first user including an activity of the first user. The correlation factor indicates a degree to which uses of the electronic devices are correlated with the state of the first user. The system generates, for the first user, an operational profile and causes operation of the electronic devices in accordance with the operational profile.

20 Claims, 18 Drawing Sheets

(56) References Cited

U.S. PATENT DOCUMENTS

| | | |
|---|---|---|
| 6,597,396 B1 | 7/2003 | Quendt |
| 7,260,597 B1 | 8/2007 | Hofrichter et al. |
| 7,352,930 B2 | 4/2008 | Lowles |
| 7,570,485 B2 | 8/2009 | Krah |
| 7,830,258 B2 | 11/2010 | McAllister |
| 7,953,327 B2 | 5/2011 | Pereira et al. |
| 7,961,674 B2 | 6/2011 | Jing et al. |
| 7,965,983 B1 | 6/2011 | Swan et al. |
| 8,049,434 B2 | 11/2011 | Crouse et al. |
| 8,096,695 B2 | 1/2012 | Ong |
| 8,156,500 B2 | 4/2012 | Helander |
| 8,161,420 B2 | 4/2012 | Ding |
| 8,204,979 B2 | 6/2012 | Vutharkar et al. |
| 8,228,198 B2 | 7/2012 | McAllister |
| 8,239,928 B2 | 8/2012 | Huang et al. |
| 8,265,674 B2 | 9/2012 | Choong et al. |
| 8,279,158 B2 | 10/2012 | Lowles et al. |
| 8,295,990 B2 | 10/2012 | Venkatakrishnan et al. |
| 8,370,370 B2 | 2/2013 | Huang et al. |
| 8,406,819 B2 | 3/2013 | Steer et al. |
| 8,407,347 B2 | 3/2013 | Zhang et al. |
| 8,409,001 B2 | 4/2013 | Chang |
| 8,471,500 B2 | 6/2013 | Fletcher et al. |
| 8,478,450 B2 | 7/2013 | Lu et al. |
| 8,508,465 B2 | 8/2013 | Broga et al. |
| 8,519,844 B2 | 8/2013 | Richey et al. |
| 8,543,688 B1 | 9/2013 | Ramamurthy |
| 8,576,276 B2 | 11/2013 | Bar-Zeev et al. |
| 8,577,378 B2 | 11/2013 | Nagaraja et al. |
| 8,606,645 B1 | 12/2013 | Applefeld |
| 8,613,070 B1 | 12/2013 | Borzycki et al. |
| 8,653,760 B1 | 2/2014 | Pearce et al. |
| 8,688,392 B2 | 4/2014 | Tam et al. |
| 8,823,795 B1 | 9/2014 | Scalisi et al. |
| 8,843,995 B2 | 9/2014 | Buckley et al. |
| 8,942,694 B2 | 1/2015 | Woo |
| 9,009,805 B1 | 4/2015 | Kirkby et al. |
| 9,207,659 B1 | 12/2015 | Sami |
| 9,325,516 B2 | 4/2016 | Pera et al. |
| 9,326,126 B2 | 4/2016 | Yang |
| 9,401,901 B2 | 7/2016 | Huang et al. |
| 9,412,266 B2 | 8/2016 | Chen et al. |
| 9,419,871 B2 | 8/2016 | Foley et al. |
| 9,462,624 B2 | 10/2016 | Logue |
| 9,479,504 B2 | 10/2016 | Bae et al. |
| 9,488,994 B2 | 11/2016 | Zywicki et al. |
| 9,528,861 B1 | 12/2016 | Haupt et al. |
| 9,547,980 B2 | 1/2017 | Chen et al. |
| 9,554,061 B1 | 1/2017 | Proctor, Jr. |
| 9,800,429 B2 | 10/2017 | Crayford et al. |
| 9,948,685 B2 | 4/2018 | Na et al. |
| 10,262,210 B2 | 4/2019 | Kirkby et al. |
| 2002/0016639 A1 | 2/2002 | Smith et al. |
| 2002/0178385 A1 | 11/2002 | Dent et al. |
| 2003/0061284 A1 | 3/2003 | Mandarino et al. |
| 2003/0067394 A1 | 4/2003 | Tsui |
| 2003/0169728 A1 | 9/2003 | Choi |
| 2004/0083393 A1 | 4/2004 | Jordan et al. |
| 2004/0243257 A1 | 12/2004 | Theimer |
| 2005/0041686 A1 | 2/2005 | Roy et al. |
| 2005/0281277 A1 | 12/2005 | Killian |
| 2006/0109988 A1 | 5/2006 | Metcalf |
| 2006/0174102 A1 | 8/2006 | Smith et al. |
| 2006/0259183 A1 | 11/2006 | Hayes et al. |
| 2007/0014303 A1 | 1/2007 | Schulz et al. |
| 2007/0105542 A1 | 5/2007 | Friedman |
| 2007/0250592 A1 | 10/2007 | Reckamp et al. |
| 2007/0294335 A1 | 12/2007 | Gershom |
| 2008/0037444 A1 | 2/2008 | Chhabra |
| 2008/0066093 A1 | 3/2008 | Igoe et al. |
| 2008/0089300 A1 | 4/2008 | Yee |
| 2008/0122606 A1 | 5/2008 | Bradley |
| 2008/0168523 A1 | 7/2008 | Ansari et al. |
| 2008/0219672 A1 | 9/2008 | Tam et al. |
| 2008/0277486 A1 | 11/2008 | Seem et al. |
| 2008/0278100 A1 | 11/2008 | Hwang |
| 2009/0033485 A1 | 2/2009 | Naeve et al. |
| 2009/0070681 A1 | 3/2009 | Dawes et al. |
| 2009/0080896 A1 | 3/2009 | Pereira et al. |
| 2009/0244097 A1 | 10/2009 | Estevez |
| 2010/0068997 A1 | 3/2010 | Dunko |
| 2010/0083356 A1 | 4/2010 | Steckley et al. |
| 2010/0130166 A1 | 5/2010 | Tsuria et al. |
| 2010/0138007 A1 | 6/2010 | Clark et al. |
| 2010/0141153 A1 | 6/2010 | Recker et al. |
| 2010/0150348 A1 | 6/2010 | Fairbanks |
| 2010/0192212 A1 | 7/2010 | Raleigh |
| 2010/0246825 A1 | 9/2010 | Baras et al. |
| 2010/0248707 A1 | 9/2010 | Hoffner et al. |
| 2010/0283579 A1 | 11/2010 | Kraus et al. |
| 2010/0283584 A1 | 11/2010 | McAllister |
| 2011/0046798 A1 | 2/2011 | Imes et al. |
| 2011/0107364 A1 | 5/2011 | Lajoie et al. |
| 2011/0121654 A1 | 5/2011 | Recker et al. |
| 2011/0172844 A1 | 7/2011 | Choong et al. |
| 2011/0199004 A1 | 8/2011 | Henig et al. |
| 2011/0202151 A1 | 8/2011 | Covaro et al. |
| 2011/0225373 A1 | 9/2011 | Ito et al. |
| 2012/0011567 A1 | 1/2012 | Cronk et al. |
| 2012/0045060 A1 | 2/2012 | Maestrini et al. |
| 2012/0049765 A1 | 3/2012 | Lu et al. |
| 2012/0082062 A1 | 4/2012 | McCormack |
| 2012/0144469 A1 | 6/2012 | Ainslie et al. |
| 2012/0167063 A1 | 6/2012 | Detwiler et al. |
| 2012/0204243 A1 | 8/2012 | Wynn et al. |
| 2012/0216296 A1 | 8/2012 | Kidron |
| 2012/0239936 A1 | 9/2012 | Holtmanns et al. |
| 2013/0026947 A1 | 1/2013 | Economy et al. |
| 2013/0041516 A1 | 2/2013 | Rockenfeller |
| 2013/0064132 A1 | 3/2013 | Low et al. |
| 2013/0073705 A1 | 3/2013 | Hester |
| 2013/0076491 A1 | 3/2013 | Brandsma et al. |
| 2013/0086665 A1 | 4/2013 | Filippi et al. |
| 2013/0124855 A1 | 5/2013 | Varadarajan et al. |
| 2013/0191755 A1 | 7/2013 | Balog et al. |
| 2013/0198786 A1 | 8/2013 | Cook et al. |
| 2013/0227656 A1 | 8/2013 | Holtmanns et al. |
| 2013/0236183 A1 | 9/2013 | Chao et al. |
| 2013/0268357 A1 | 10/2013 | Heath |
| 2013/0276140 A1 | 10/2013 | Coffing et al. |
| 2013/0340050 A1 | 12/2013 | Harrison |
| 2014/0007222 A1 | 1/2014 | Qureshi et al. |
| 2014/0068705 A1 | 3/2014 | Chambers et al. |
| 2014/0068789 A1 | 3/2014 | Watts et al. |
| 2014/0099933 A1 | 4/2014 | Yerrabommanahalli et al. |
| 2014/0129006 A1 | 5/2014 | Chen et al. |
| 2014/0137188 A1 | 5/2014 | Bartholomay et al. |
| 2014/0157370 A1 | 6/2014 | Plattner et al. |
| 2014/0164758 A1 | 6/2014 | Ramamurthy |
| 2014/0164776 A1 | 6/2014 | Hook et al. |
| 2014/0173692 A1 | 6/2014 | Srinivasan et al. |
| 2014/0189359 A1 | 7/2014 | Marien et al. |
| 2014/0189808 A1 | 7/2014 | Mahaffey et al. |
| 2014/0245411 A1 | 8/2014 | Meng et al. |
| 2014/0245461 A1 | 8/2014 | O'Neill et al. |
| 2014/0248852 A1 | 9/2014 | Raleigh et al. |
| 2014/0266600 A1 | 9/2014 | Alberth, Jr. et al. |
| 2014/0273963 A1 | 9/2014 | Su et al. |
| 2014/0281497 A1 | 9/2014 | Medvinsky et al. |
| 2014/0282570 A1 | 9/2014 | Prasanna |
| 2014/0282877 A1 | 9/2014 | Mahaffey et al. |
| 2014/0310509 A1 | 10/2014 | Potlapally et al. |
| 2014/0310510 A1 | 10/2014 | Potlapally et al. |
| 2015/0015369 A1 | 1/2015 | Lamb |
| 2015/0043377 A1 | 2/2015 | Cholas et al. |
| 2015/0071052 A1 | 3/2015 | Hershberg et al. |
| 2015/0126153 A1 | 5/2015 | Spitz et al. |
| 2015/0160634 A1 | 6/2015 | Smith et al. |
| 2015/0177292 A1 | 6/2015 | Silveira Filho et al. |
| 2015/0195100 A1 | 7/2015 | Imes et al. |
| 2015/0215297 A1 | 7/2015 | Rathod et al. |
| 2015/0249855 A1 | 9/2015 | Dewa et al. |
| 2015/0282216 A1 | 10/2015 | Reshef et al. |
| 2016/0044032 A1 | 2/2016 | Kim et al. |

(56) References Cited

U.S. PATENT DOCUMENTS

| | | |
|---|---|---|
| 2016/0089457 A1 | 3/2016 | Liao et al. |
| 2016/0132031 A1 | 5/2016 | Kozura et al. |
| 2016/0142263 A1 | 5/2016 | Erdmann et al. |
| 2016/0191264 A1 | 6/2016 | Kim et al. |
| 2016/0370208 A1 | 12/2016 | Patel et al. |
| 2016/0380945 A1 | 12/2016 | Wood et al. |
| 2016/0381500 A1 | 12/2016 | Larson |
| 2017/0285893 A1 | 10/2017 | Shim et al. |

OTHER PUBLICATIONS

Google Inc., International Search Report and Written Opinion, PCT/US2015/053291, dated Feb. 5, 2016, 18 pgs.

Google Inc., International Search Report and Written Opinion, PCT/US2015/060405, dated Feb. 25, 2016, 9 pgs.

Goadrich, Mark H., and Michael P. Rogers. "Smart smartphone development: iOS versus Android." In Proceedings of the 42nd ACM technical symposium on Computer science education, pp. 607-612. ACM, 2011.

Manashty, Ali Reza, Amir Rajabzadeh, and Zahra Forootan Jahromi. "A Scenario-Based Mobile Application for Robot-Assisted Smart Digital Homes." arXiv preprint arXiv:1009.5398 (2010).

Armac, Ibrahim, and Daniel Retkowitz. "Simulation of smart environments." In IEEE International Conference on Pervasive Services, pp. 257-266. IEEE, 2007.

Ramlee, Ridza Azri, Man Hong Leong, Ranjit Singh A. Sarban Singh, Mohd Muzafar Ismail, Mohd Azlishah Othman, Hamzah Asyrani Sulaiman, Mohamad Harris Misran, Meor Said, and Maizatul Alice. "Bluetooth remote home automation system using android application." (2013): 1-5.

Van Nguyen, Tam, Jin Gook Kim, and Deokjai Choi. "ISS: the interactive smart home simulator." In Advanced Communication Technology, 2009. ICACT 2009. 11th International Conference on, vol. 3, pp. 1828-1833. IEEE, 2009.

Rajabzadeh, Amir, Ali Reza Manashty, and Zahra Forootan Jahromi. "A Mobile Application for Smart House Remote Control System." arXiv preprint arXiv:1009.5557 (2010).

Gavalas, Damianos, and Daphne Economou. "Development platforms for mobile applications: Status and trends." IEEE software 28, No. 1 (2011): 77-86.

Y. Zatout, "Using wireless technologies for healthcare monitoring at home: A survey," 2012 IEEE 14th International Conference on e-Health Networking, Applications and Services (Healthcom), Beijing, 2012, pp. 383-386. URL: http://ieeexplore.ieee.org/stamp/stamp.jsp?tp=&arnumber=6379443&isnumber=6379371.

"INSTEON Compared" www.insteon.com/pdf/insteoncompared.pdf version.2 2013.

"Thread Group Information Event" https://www.threadgroup.org/Portals/O/documents/events/ThreadIntro.pdf; Sep 30, 2014.

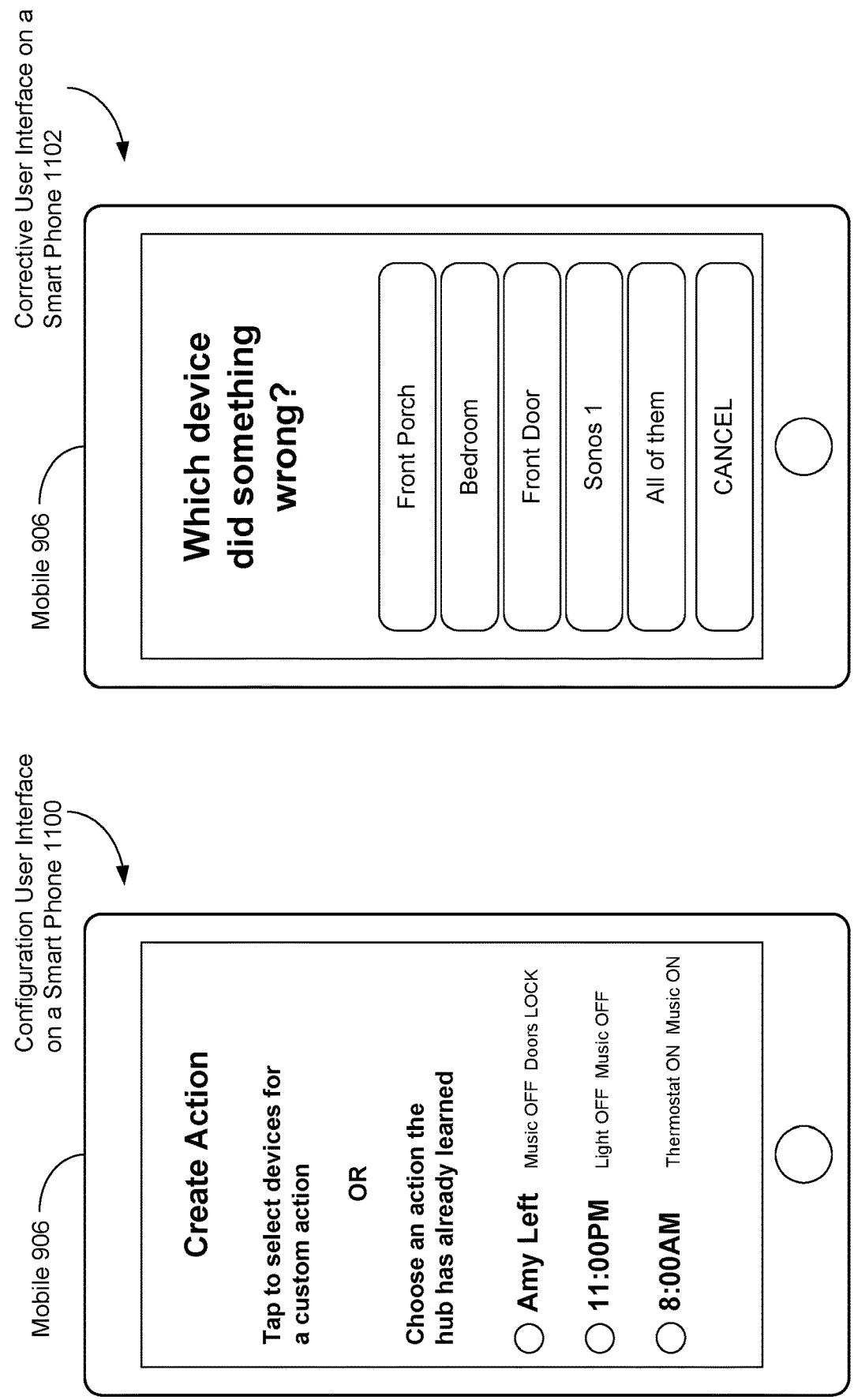

SYSTEMS AND METHODS FOR PROGRAMMING AND CONTROLLING DEVICES WITH SENSOR DATA AND LEARNING

PRIORITY CLAIM AND RELATED APPLICATIONS

This application is a continuation of U.S. patent application Ser. No. 14/581,994, entitled "Systems and Methods for Programming and Controlling Devices with Sensor Data and Learning," filed on Dec. 23, 2014, which claims priority to U.S. Provisional Patent Application No. 61/919,893, filed on Dec. 23, 2013, each of which is hereby incorporated by reference in its entirety.

TECHNICAL FIELD

This relates generally to computer technology, including but not limited to methods and systems for generating operational profiles for users and operating devices in accordance with such operational profiles.

BACKGROUND

Smart home automation devices are being developed and fielded at such a rapid pace that new devices appear on the market practically every day. Because of the proliferation of low-power wireless network and smart phone technologies, it is not uncommon to find home and business owners in possession of smart home devices such as wireless lights, music systems, door locks, thermostats and alarm systems. And wireless white goods are just over the horizon. Based on current trends, it is expected that the average consumer will own as many as five to ten smart home devices in just a few years.

Presently, professional installers, hobbyists, and sometimes consumers themselves program home automation systems. The purpose of this programming is to automate mundane tasks such as turning porch lights on and off at certain times of the day, waking up to music in the morning, unlocking the door as the owner approaches, or setting up associations between sensors (e.g., enabling flood sensors to push notification alerts to smart phones). Heretofore, methods of programming these systems typically utilize complex web applications, scripting languages, or complex desktop/laptop application programs. Since the types of configurations that users employ vary widely (i.e., wanting products to operate in different sequences, for example), the aforementioned applications and user interfaces become very complex to account for all these variances.

As one skilled in the art will appreciate, present day techniques for the programming of automated systems for home automation installations is very complex and time consuming. Furthermore, most of this complexity is designed into individual products to allow for a wide variety of configurability. For example, each and every feature request typically requires an additional product function with a checkbox, menu, or pull-down to enable users who desire that feature within their unique configuration. As a result, the programming techniques for home automation products have become so complex and overwhelming to the average consumer that the consumer is driven away from these products. The average consumer desires convenience rather than the programming complexities associated with extreme customization.

Therefore, it would be desirable to develop convenient, user-friendly solutions to address the above-recited issues associated with smart home devices.

SUMMARY

The present invention overcomes the above noted limitations of the prior art, and others, by providing a superior self-programming mechanism that may be disposed within any home automation product. Rather than utilizing a traditional programming interface, elements of the products themselves are employed to program the corresponding home automation system. The present invention may be employed in consumer electronic products that provide value to consumers through the automation of in-home technologies. By eliminating complex programming requirements and corresponding complex user interfaces, these in-home technologies allow for configuration of products in a substantially more intuitive manner, thus making these products more useful and timesaving for consumers.

In accordance with some implementations, a method is performed at a system having a plurality of electronic devices, at least one of the plurality of electronic devices having one or more processors and memory storing instructions for execution by the one or more processors. The method includes: collecting usage information of one or more of the plurality of electronic devices for a plurality of known users within a premise, and identifying, for a first user of the plurality of known users, a usage pattern of the one or more electronic devices based on the collected usage information. A correlation factor of the usage pattern for the first user is then determined. Based on the determined correlation factor of the usage pattern for the first user, an operational profile with which to operate the one or more electronic devices is generated for the first user. The one or more electronic devices are then operated in accordance with the operational profile for the first user.

In accordance with some implementations, a system includes a plurality of electronic devices, wherein at least one of the plurality of electronic devices has one or more processors and memory storing one or more programs for execution by the processor, the one or more programs including instructions for performing the operations of the method described above. In accordance with some implementations, a computer readable storage medium has stored therein one or more programs having instructions which, when executed by an electronic device having one or more processors, cause the electronic device to perform the operations of the method described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 11A and 11B are example user interfaces for managing operational profiles, in accordance with some implementations.

Like reference numerals refer to corresponding parts throughout the several views of the drawings.

DESCRIPTION OF IMPLEMENTATIONS

Figure 1:
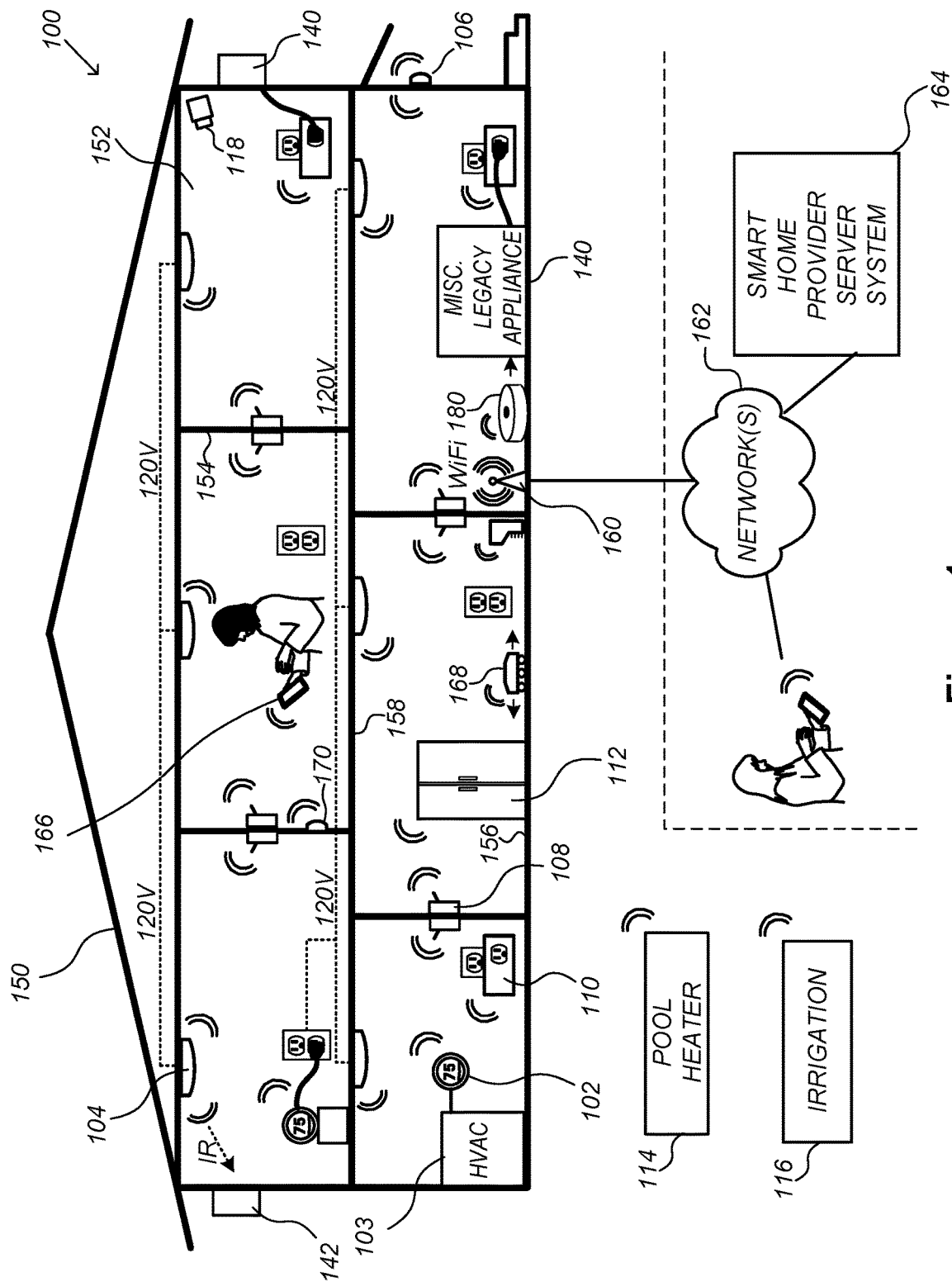
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first type of request could be termed a second type of request, and, similarly, a second type of request could be termed a first type of request, without departing from the scope of the various described implementations. The first type of request and the second type of request are both types of requests, but they are not the same type of request.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls.

Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gate). The smart home environment 100 may additionally or alternatively include one or more other occupancy sensors (e.g., the smart doorbell 106, smart doorlocks, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a mobile phone, such as a smart phone) 166. A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116 and/or 118 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub.

Generally, in some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected thermostats 102, hazard detectors 104, doorbell 106, wall switches 108, wall plugs 110, appliances 112, cameras 118 and the like. Each of these smart devices optionally communicates with the hub device 180 using a radio communication network available at least in the smart home environment 100.

Figure 2:
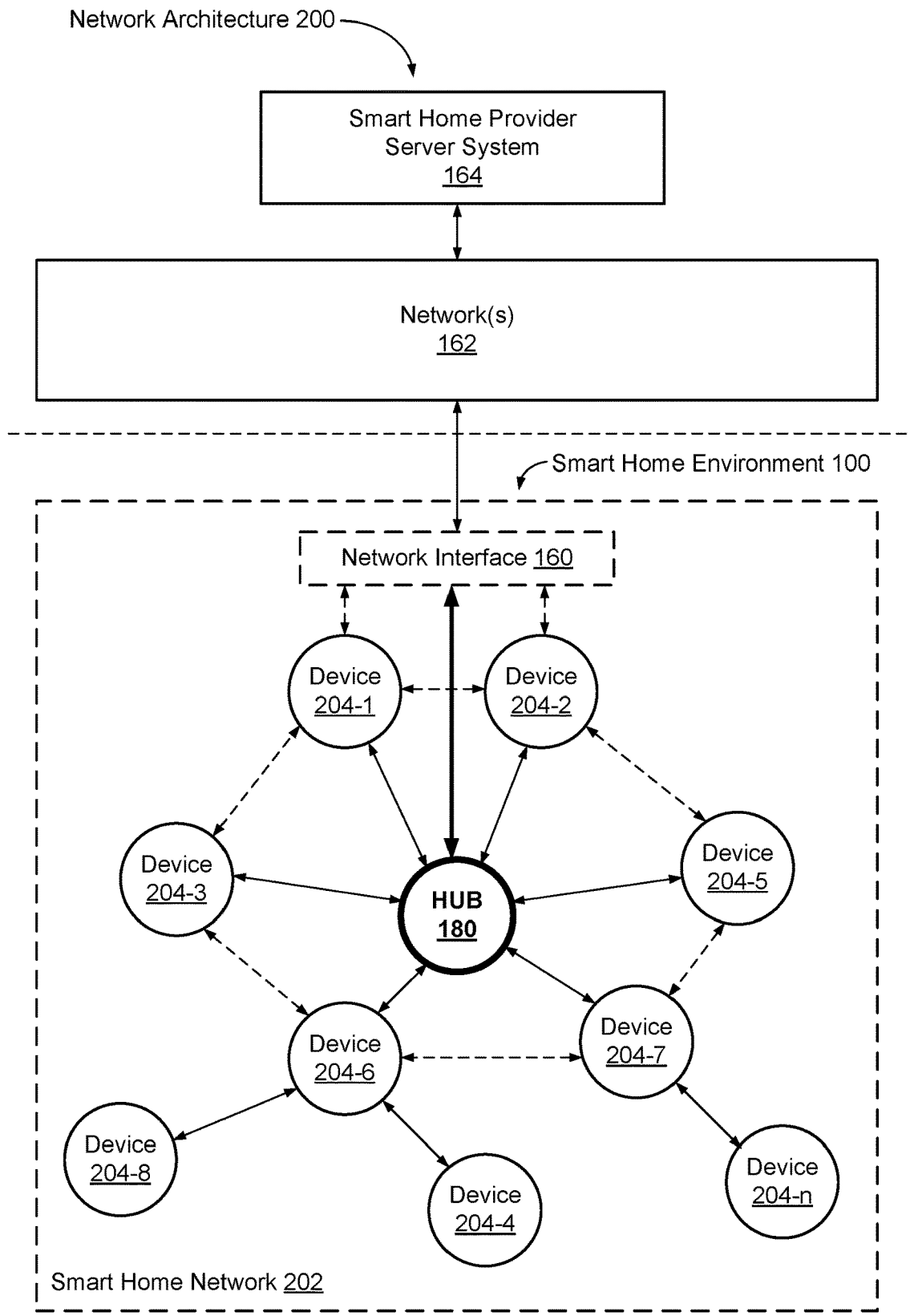
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116 and/or 118) combine with hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands back to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. The hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
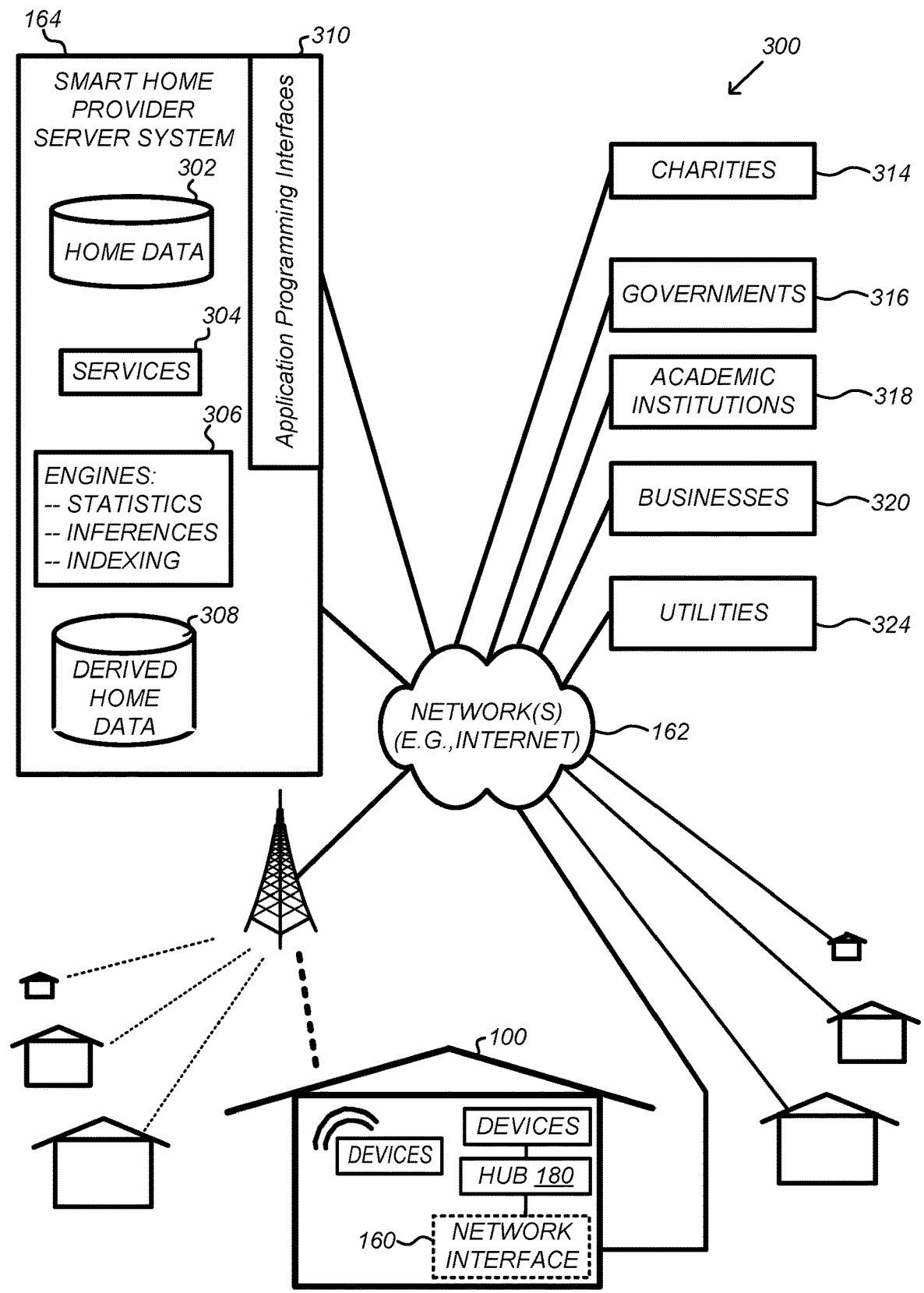
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
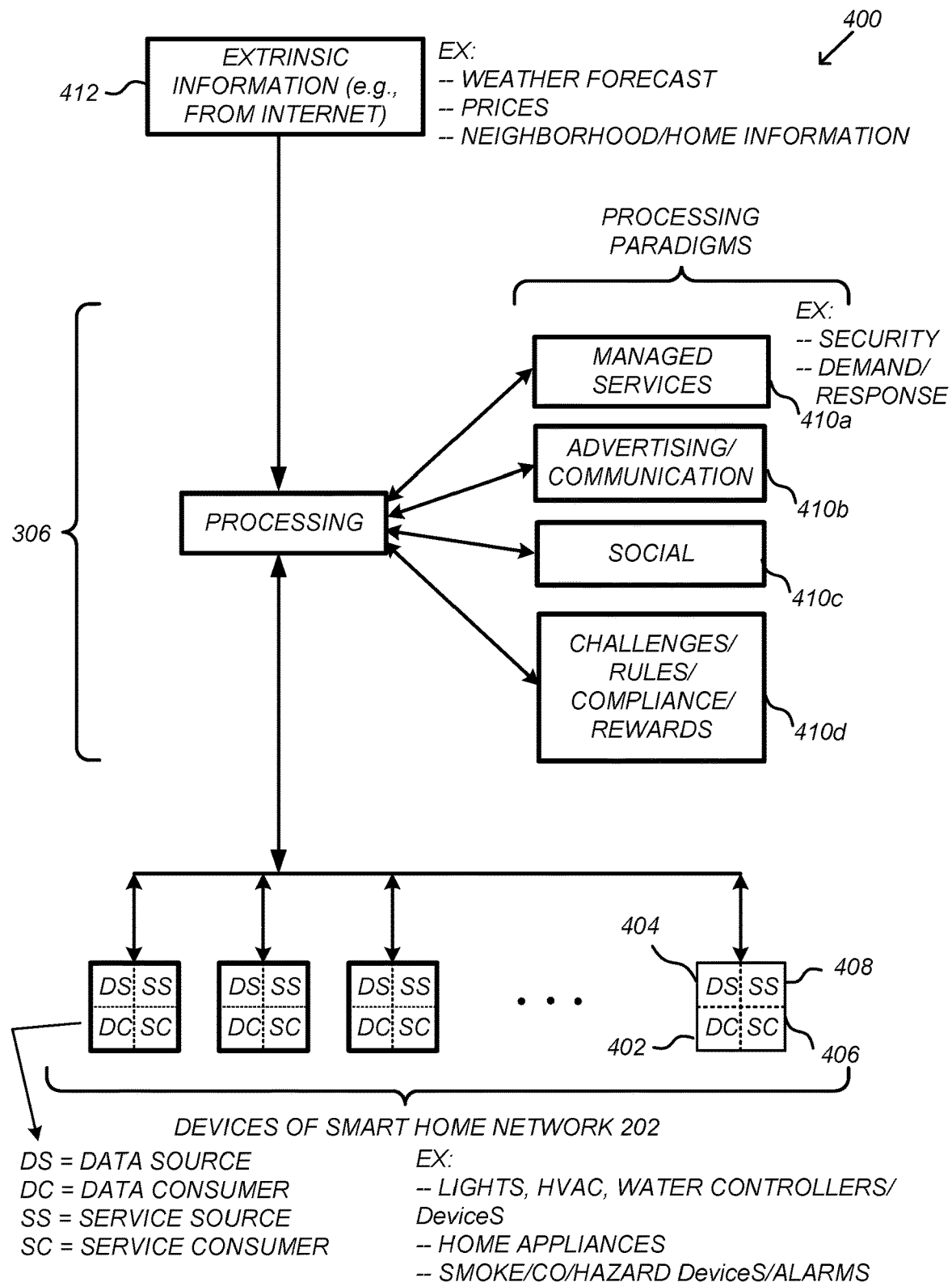
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
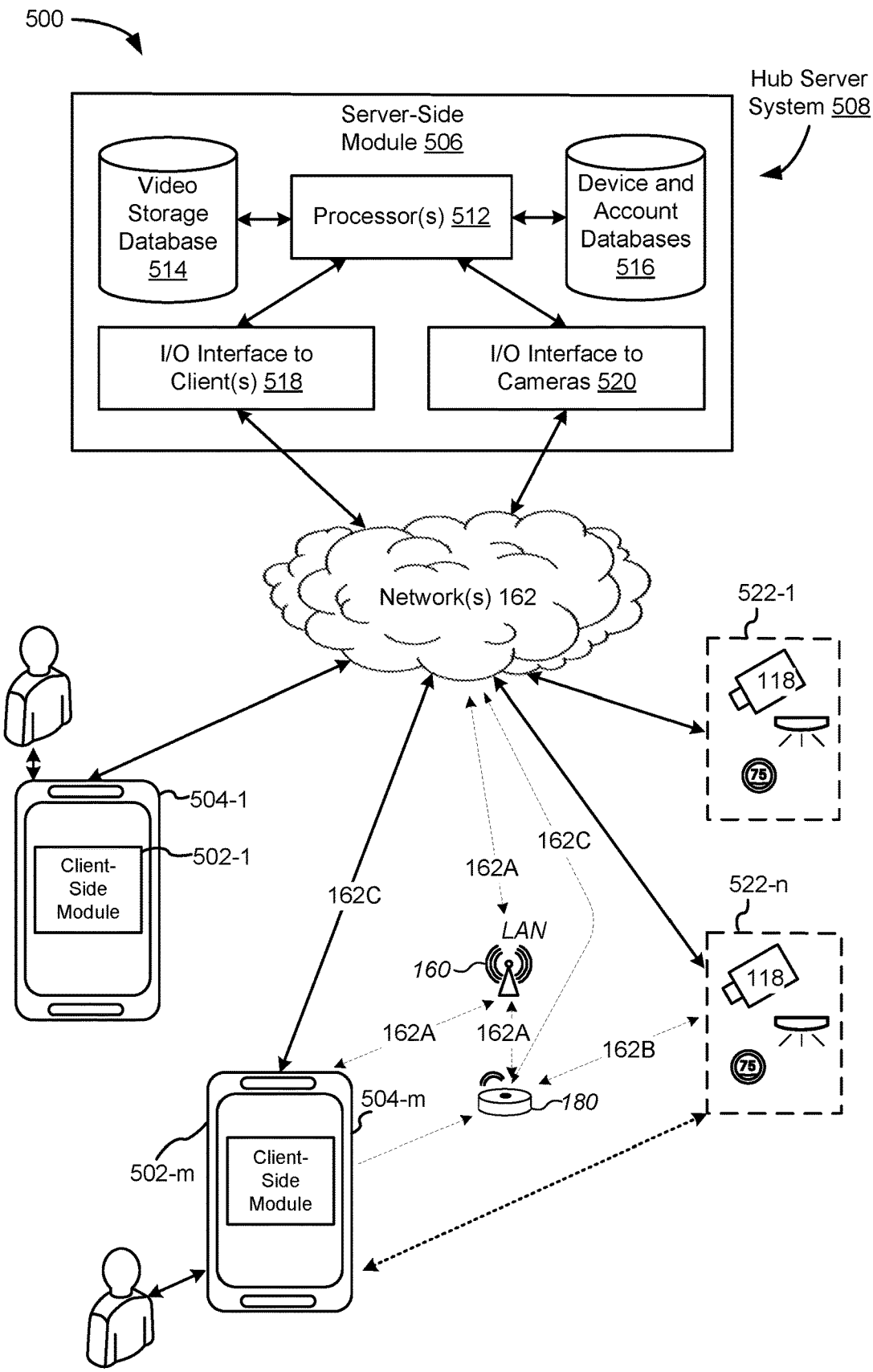
FIG. 5 is a representative operating environment in which a hub server system interacts with client devices and hubs communicatively coupled to local smart devices, in accordance with some implementations.

FIG. 5 illustrates a representative operating environment 500 in which a hub server system 508 provides data processing for monitoring and facilitating review of motion events in video streams captured by video cameras 118. As shown in FIG. 5, the hub server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub server system 508. In some implementations, the hub server system 508 is a dedicated video processing server that provides video processing services to video sources and client devices 504 independent of other services provided by the hub server system 508.

In some implementations, each of the video sources 522 includes one or more video cameras 118 that capture video and send the captured video to the hub server system 508 substantially in real-time. In some implementations, each of the video sources 522 optionally includes a controller device (not shown) that serves as an intermediary between the one or more cameras 118 and the hub server system 508. The controller device receives the video data from the one or more cameras 118, optionally, performs some preliminary processing on the video data, and sends the video data to the hub server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub server system 508.

As shown in FIG. 5, in accordance with some implementations, each of the client devices 504 includes a client-side module 502. The client-side module 502 communicates with a server-side module 506 executed on the hub server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub server system 508 is implemented on one or more standalone data processing apparatuses or a distributed network of computers. In some implementations, the hub server system 508 also employs various virtual devices and/or services of third party service providers (e.g., third-party cloud service providers) to provide the underlying computing resources and/or infrastructure resources of the hub server system 508. In some implementations, the hub server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub server system 508 can vary in different implementations. For example, in some implementations, client-side module 502 is a thin-client that provides only user-facing input and output processing functions, and delegates all other data processing functionalities to a backend server (e.g., the hub server system 508). Similarly, in some implementations, a respective one of the video sources 522 is a simple video capturing device that continuously captures and streams video data to the hub server system 508 without no or limited local preliminary processing on the video data. Although many aspects of the present technology are described from the perspective of the hub server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub server system 508, the client device 504, and the video sources 522 cooperatively.

It should be understood that operating environment 500 that involves the hub server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B via which at least some of the electronic devices 522-m exchange data with the hub device 160. Alternatively, in some situations, some of the electronic devices 522-m communicate with the network interface device 160 directly via the same sub-network 162A that couples devices 160, 180 and 504-m. In some implementations (e.g., in the network 162C), both the client device 504-m and the electronic devices 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device 522-n. As explained above, the network interface device 160 and the hub device 180 optionally communicate with each other via a sub-network 162A. However, a provisioning process is required to establish the communication between the network interface device 160 and the hub device 180 via the sub-network 162A. Specifically, a new hub device 180 has to receive a network identification and a network password associated with the sub-network 162A, such that the hub device 180 could communicate device information of the hub device 180 to the server 508 and allow the server 508 to associate the hub device 180 with one or more user accounts.

In some implementations, at least an optical link is formed between the client device 504-*m* and the hub device 180. The client device 504-*m* is configured to generate optical data (e.g., light flashes) coded with network information and user account information. The hub device 180 includes a light sensor that captures the optical data and recovers the network and user account information. Then, the hub device 180 uses the recovered network and user account information to access the sub-network 162A, the network(s) 162 and the server 508 and associate with a user account on the server 508.

Figure 6:
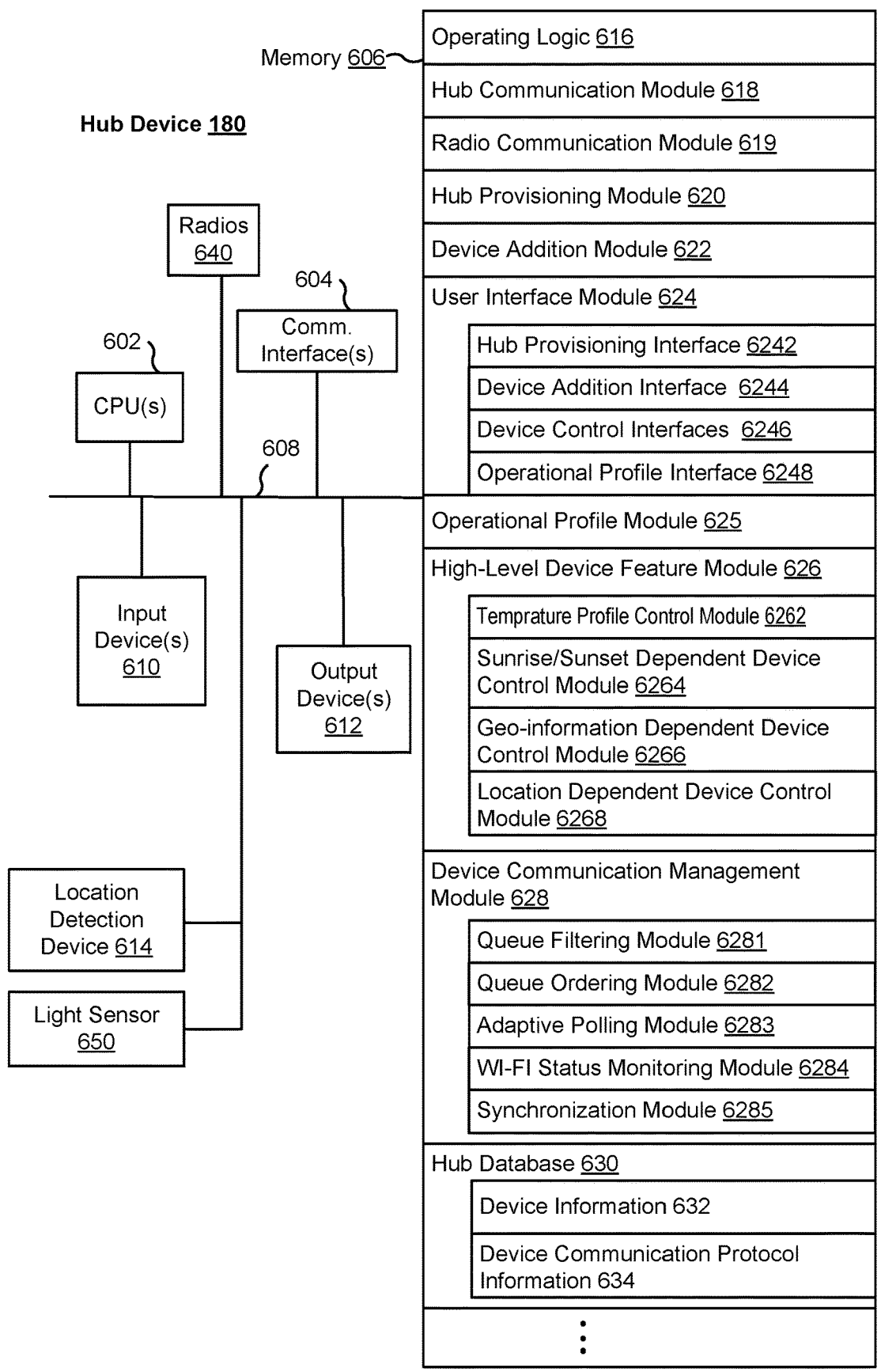
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, light sensor 650, and one or more communication buses 508 for interconnecting these components (sometimes called a chipset). In some implementations, the electronic device 602 includes one or more input devices 610 such as one or more buttons for receiving input. In some implementations, the electronic device 602 includes one or more output devices 612 such as one or more indicator lights, a sound card, a speaker, a small display for displaying textual information and error codes, etc. Furthermore, some the electronic device 602 uses a microphone and voice recognition or a camera and gesture recognition to supplement or replace the keyboard. In some implementations, the electronic device 602 includes a location detection device 614, such as a GPS (global positioning satellite) or other geo-location receiver, for determining the location of the electronic device 602.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. The light sensor 650 senses light flashes from a device that is placed in proximity to the light sensor 650.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 619 for connecting the hub device 180 to other client devices (e.g., controller devices, smart devices 204 in smart home environment 100) via one or more radio communication devices (e.g., radios 640)
- Hub provisioning module 620 for provisioning the hub and electronic devices, which optionally includes: an account hub device link module (not shown) for associating one or more electronic devices 522 or hub 180 with a corresponding user account, and a secure network setup module (not shown) for setting up secure network connections for both the hub and the electronic devices;
- Device addition module 622 for adding a new electronic device (e.g., smart device 204-1 in smart home environment 100, FIG. 1) after a hub has been properly set up;
- User interface module 624, including but not limited to:
  - Hub provisioning interface 6242 for providing and displaying a user interface during the device provisioning process (e.g., performed by hub provisioning module 620);
  - Sensor addition interface 6244 for providing and displaying a user interface when a new device is being added (e.g., performed by device addition module 622);
  - Sensor control interfaces 6246 for providing and displaying a user interface in which settings, captured data, and/or other data for one or more sensor devices (e.g., light sensor 650) can be modified and/or viewed; and
  - Operational profile interface 6248 for activating/deactivating, modifying, correcting, and/or overriding an operational profile (e.g., user interfaces 1100 and 1102, FIGS. 11A and 11B);
- Operational profile module 625 for collecting usage information, identifying usage patterns, determining correlation factors of identified usage patterns, and sending instructions to one or more devices (e.g., devices 204, FIG. 2) to operate the devices in accordance with the operational profile;
- High-level sensor feature module 626, including but not limited to:
  - Temperature profile control module 6262 for creating and maintaining temperature profiles of one or more devices (e.g., one or more smart devices in smart home environment 100), wherein temperature profiles include operations settings (e.g., scheduling) for manipulating the temperature of the one or more devices;
  - Sunrise/sunset dependent sensor control module 6264 for computing (e.g., based on information retrieved from geo-information dependent sensor control module 6266, and/or location dependent sensor control module 6268) sunrise and/or sunset times, and accordingly adjusting operations settings for one or more devices (e.g., dimming a light, closing a smart curtain, adjusting a thermostat, etc.);

Geo-information dependent sensor control module 6266 for detecting surrounding environmental characteristics of hub device 180, such as information of surrounding terrain (e.g., mountain ranges, desert, etc.) and/or nearby obstructions (e.g., tall buildings, trees, etc.);

Location dependent sensor control module 6268 for detecting a location of hub device 180 (e.g., GPS coordinates);

Sensor communication management module 628, including but not limited to:

Queue filtering module 6281 for manipulating and processing commands received from one or more devices (e.g., splitting commands into commands for specific devices, translating commands in accordance with protocols of corresponding devices, etc.)

Queue ordering module 6282 for determining an order of commands (e.g., received and processed by queue filtering module 6281) in a command queue of hub device 180;

Adaptive polling module 6283 for storing device information (e.g., device type, protocol, application state, changes to device state, time of last poll, etc. of smart devices in smart home environment 100, FIG. 1), configuring polling modes (e.g., frequency of polling), and sending polling commands to the one or more devices;

Wi-Fi Status monitoring module 6284 for determining a status of one or more communication interfaces 604 (e.g., Wi-Fi);

Synchronization module 6285 for receiving messages from, and transmitting messages to, one or more devices (e.g., smart devices in smart home environment 100, FIG. 1), wherein messages include control requests (e.g., a command to adjust thermostat), responses, and state information (e.g., information conveying changes in device state); and Hub database 630, including but not limited to:

Sensor information 632 for storing and managing data received, detected, and/or transmitted by one or more sensors (e.g., light sensor 650) of hub device 180; and Sensor communication protocol information 634 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
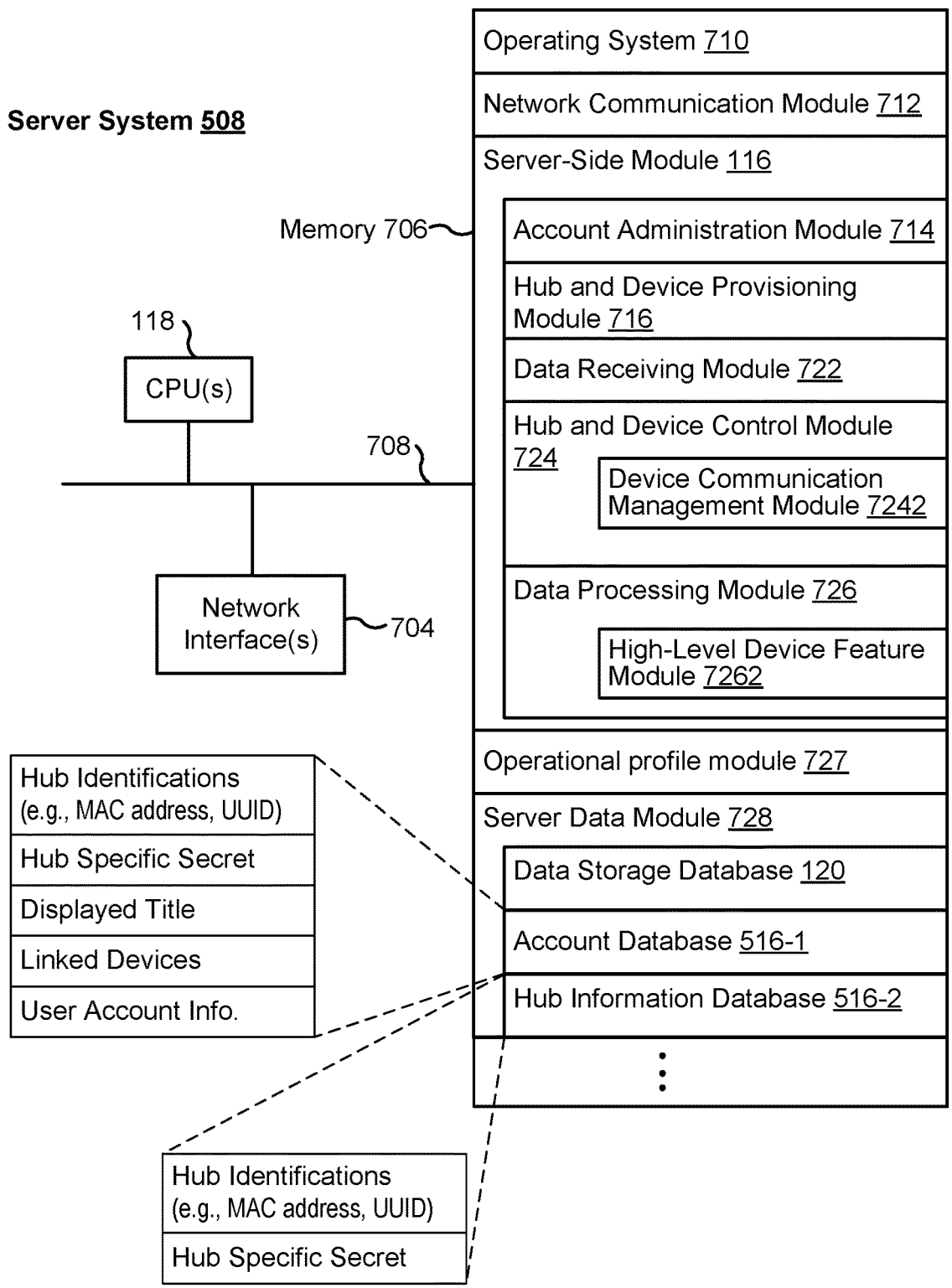
FIG. 7 is a block diagram illustrating server system, in accordance with some implementations.

FIG. 7 is a block diagram illustrating the server system 508 in accordance with some implementations. The server system 508, typically, includes one or more processing units (CPUs) 118, one or more network interfaces 704 (e.g., including I/O interface to one or more clients 86 and I/O interface to one or more the electronic devices), memory 116, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 118. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 710 including procedures for handling various basic system services and for performing hardware dependent tasks;

Network communication module 712 for connecting the server system 508 to other client devices (e.g., the client devices and the electronic devices (including e.g., cameras) connected to one or more networks 162 via one or more network interfaces 704 (wired or wireless);

Server-side module 116, which provides server-side functionalities for account management, device provision, device control, data processing and data review, including but not limited to:

Account administration module 714 for creating user accounts, and providing account login-services to client devices;

Hub and device provisioning module 716 for provisioning hubs and electronic devices (sometimes in cooperation with the account registration module 714), which optionally includes: an account hub device link module (not shown) for associating one or more electronic devices 522 or hub 180 with a corresponding user account, a secure network setup module (not shown) for setting up secure network connections for both the hub and the electronic devices, and a device addition module (not shown) for adding a new smart electronic device after a hub has been properly set up;

Data receiving module 722 for receiving data (e.g., video data) from electronic devices via the hub device, and preparing the received data for further processing and long-term storage in the data storage database 120;

Hub and device control module 724 for generating and sending server-initiated control commands to modify operation modes of the electronic devices, and/or receiving and forwarding user-initiated control commands to modify operation modes of the electronic devices, wherein the hub and device control module 86 at least includes a device communication management module 7242;

Data processing module 726 for processing the data provided by the electronic devices such that the processed data could be forwarded to a client device and reviewed by a user who logs onto a corresponding user account on the specific client device, wherein in some implementations, the data processing module 726 includes a high-level device feature module 7262; and Operational profile module 727 for collecting usage information, identifying usage patterns, determining correlation factors of identified usage patterns, and sending instructions to one or more devices (e.g., devices 204, FIG. 2) to operate the devices in accordance with the operational profile; and Server data module 728 storing data for use in account management, hub provision and control, device provision and control, data processing and data review, including but not limited to:

Data storage database 120 for storing data associated with each electronic device 802 (e.g., each camera) of each user account, as well as data processing models, processed data results, and other relevant metadata (e.g., names of data results, location of electronic device 802, creation time, duration, settings of the electronic device 802, etc.) associated with the data, wherein (optionally) all or a portion of the data and/or processing associated with the hub 180 or smart devices stored securely;

Account database 516-1 for storing account information for user accounts, including user account information, information for linked hubs and electronic devices (e.g., hub identifications), hub specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 516-2 for storing device information related to one or more hub devices, e.g., device identifiers and hub specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 116, optionally, stores a subset of the modules and data structures identified above. Furthermore, memory 116, optionally, stores additional modules and data structures not described above.

Figure 8:
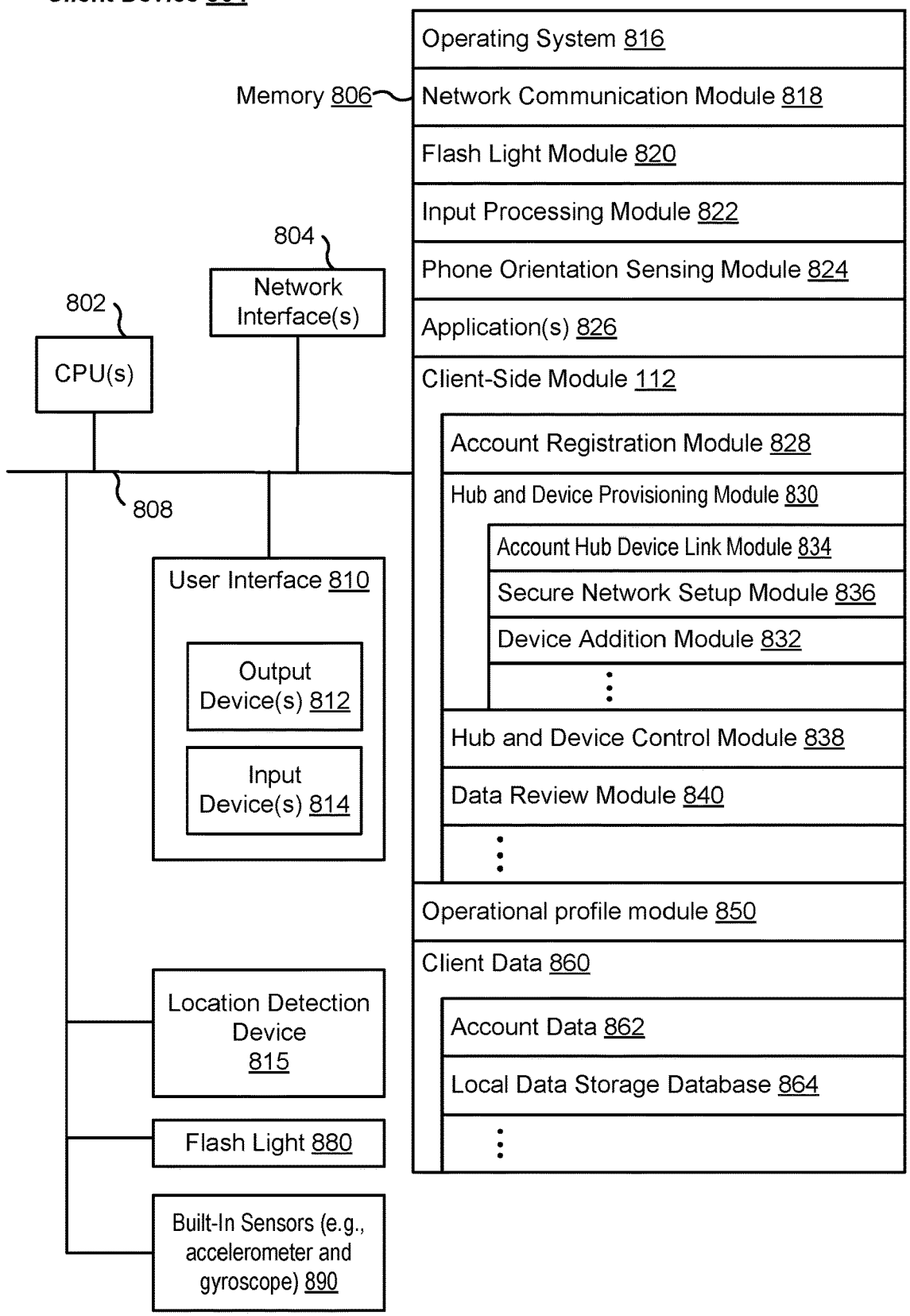
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810, a flash light 880, and one or more built-in sensors 890 (e.g., accelerometer and gyroscope). User interface 810 includes one or more output devices 812 that enable presentation of media content, including one or more speakers and/or one or more visual displays. Optionally, output devices 812 (e.g., a visual display) is used for sending signals (e.g., to light sensor 650 of hub 180) during a provisioning/commissioning process. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images, for example, of graphic series codes printed on the electronic devices. Optionally, the client device includes a location detection device 815, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 816 including procedures for handling various basic system services and for performing hardware dependent tasks;

Network communication module 818 for connecting the client device to other client devices (e.g., server system 508 and the electronic devices) connected to one or more networks 162 via one or more network interfaces 804 (wired or wireless);

Flash light module 820 for producing flashes of light (e.g., for detection by light sensor 650 of hub 180) as signals during a provisioning/commissioning process;

Input processing module 822 for detecting one or more user inputs or interactions from one of the one or more input devices 814 and interpreting the detected input or interaction;

Phone orientation sensing module 824 for determining the orientation of the client device 504 based on data sensed by the built-in sensors 890;

One or more applications 826 for execution by the client device (e.g., games, social network applications, smart home applications, and/or other web or non-web based applications) for controlling hubs and electronic devices (e.g., sending commands, configuring settings, etc.) and for reviewing data captured by the electronic devices (e.g., device status and settings, captured data, or other information regarding the hub or other connected devices);

Client-side module 112, which provides client-side functionalities for device provisioning, device control, data processing and data review, including but not limited to:

Account registration module 828 for establishing a user account;

Hub and device provisioning module 830 that provisions hubs and electronic devices (sometimes in cooperation with the account registration module 828) and includes an account hub device link module 834 for associating one or more electronic devices 522 or hub 180 with a corresponding user account, a secure network setup module 836 for setting up secure network connections for both the hub and the electronic devices, and a device addition module 832 for adding a new smart electronic device after a hub has been properly set up;

Hub and device control module 838 for generating control commands for modifying an operating mode of the hub or the electronic devices in accordance with user input; and Data review module 840 for providing user interfaces for reviewing the data that are processed by server system 508 and displayed on the display of the client device;

Operational profile module 850 for collecting usage information, identifying usage patterns, determining correlation factors of identified usage patterns, and sending instructions to one or more devices (e.g., devices 204, FIG. 2) to operate the devices in accordance with the operational profile; and client data 860 storing data associated with the user account and electronic devices, including, but is not limited to:

Account data 862 storing information related with both user accounts loaded on the client device 504 and electronic devices 522 associated with the user accounts, wherein such information includes cached login credentials, hub identifiers (e.g., MAC addresses and UUIDs), electronic device identifiers (e.g., MAC addresses and UUIDs), user interface settings, display preferences, authentication tokens and tags, password keys, etc.; and Local data storage database 864 for selectively storing raw or processed data associated with electronic devices 522 (e.g., a camera) that has been linked to the user accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the server system 508 are performed by the client device 504 and/or the hub 180, and the corresponding sub-modules of these functions may be located within the client device 504 and/or the hub 180, rather than server system 508. Similarly, in some implementations, at least some of the functions of the client device and/or the hub are performed by the server system 508, and the corresponding sub-modules of these functions may be located within the server system 508 rather than client device and/or the hub. Thus, for example, identifying usage patterns and determining correlation factors are performed in part by the operational profile module 625 of hub 180 (FIG. 6), in part by operational profile module 508 of the server system 508 (FIG. 7), and/or in part by operational profile module 850 of the client device 504. The hub device 180, the server system 508, and the client device 504, shown in FIGS. 6, 7, and 8, respectively, are merely illustrative, and different configurations of the modules for implementing the functions described herein are possible in various implementations.

Figure 9:
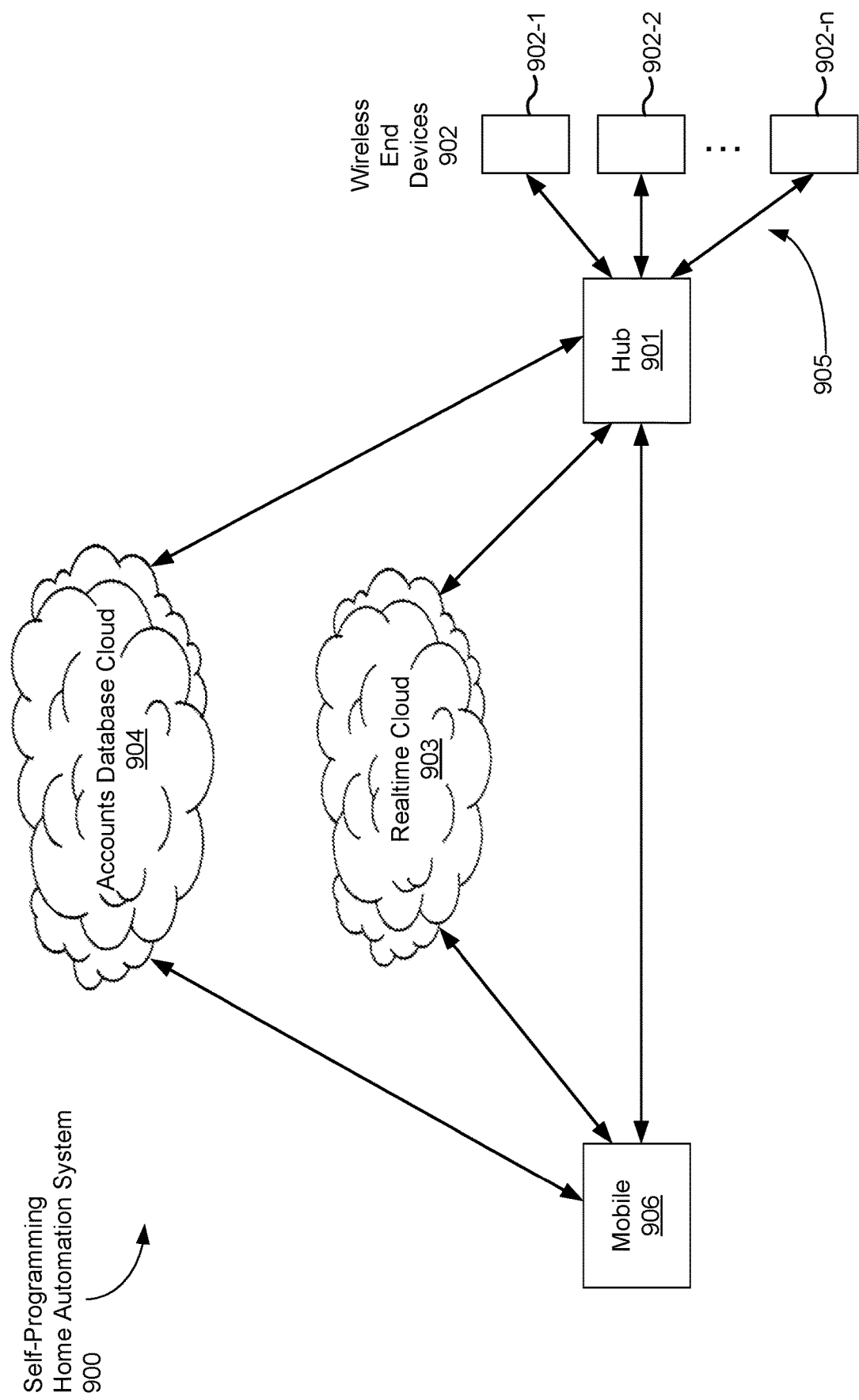
FIG. 9 is a block diagram illustrating an example self-programming home automation system, in accordance with some implementations.

FIG. 9 is a block diagram illustrating an example self-programming home automation system 900, in accordance with some implementations.

The system 900 includes a hub 901 (or, "gateway" 901), located at a consumer's premises. The hub 901 is coupled to one or more wireless end devices 902 via one or more differing wireless radio links 905 (e.g., 802.11, BLUETOOTH®, ZIGBEE®). These devices 902 may include, but are not limited to, lights, locks, thermostats, video cameras, sound systems and speakers, alarms, sound sensors, and occupancy sensors. The hub 901 may optionally be coupled to a mobile device 906 such as, but not limited to, a smart phone or tablet computer. The hub 901 and mobile device 906 may be coupled via known mechanisms to cloud services such as an accounts database cloud 904 and a realtime cloud 903 that provides for real time analysis, control, and management of the system 900. In some implementations, the functionality of the hub 180 described above (FIG. 6) is implemented by the hub 901.

Figure 10:
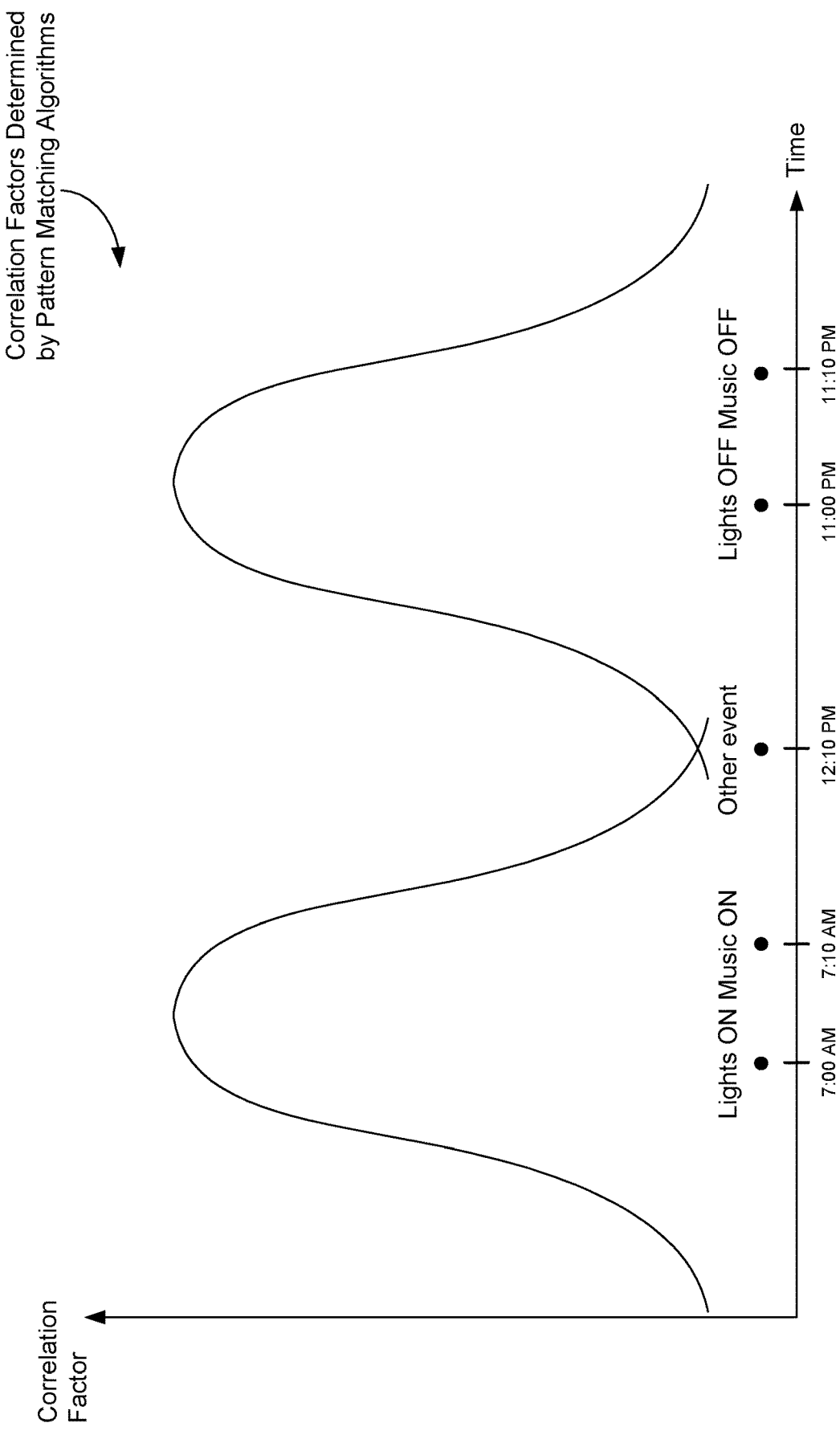
FIG. 10 is a graph illustrating the determination of correlation factors for usage patterns, in accordance with some implementations.

In operation, the system 900 (via application programs distributed between the hub 901 and clouds 903-904) observes the consumer's normal everyday usage of the devices 902 and determines sequences of actions the consumer takes throughout their day for each of the devices 902. The application programs within the system 900 are configured to employ pattern matching algorithms to determine correlations in time associated with usage of the devices 902, as is illustrated in FIG. 10 (not drawn to scale). For example, consider a scenario where the consumer turns on bathroom lights at 7 AM, 10 minutes later turns on a sound system, and then an occupancy sensor indicates that the consumer has entered the kitchen and moments later has manually turned on the lights. Accordingly, the system 900 would assign a higher correlation factor to utilization of these devices 902 at the noted times. Consequently, the system 900 observes and correlates the consumer's typical usage of one or more of the devices 902 in such a manner that the system 900 determines (or, "learns") typical usage patterns in order to replicate (or, "replay") those patterns in an automated manner subsequently.

In one specific example, the system 900 observes typical usage patterns on a device 902, say, a sound system for more than one consumer. In one implementation, distinction between consumers and their associated locations may be determined via conventional mechanisms (e.g., smart phone/tablet location determined by geofencing, wireless connectivity, or GPS). The system 900 thus notes that when a first consumer comes home, they play a PANDORA® station entitled "New Order." The system 900 further notes that when a second consumer gets ready for work, they play IHEARTRADIO® station entitled "Kaskade." Accordingly, the system 900 learns that that there are only two stations amongst thousands of radio stations in which the two consumers are truly interested. Consequently, the system 900 may generate a very simple user interface for configuration that provides just options: radio station 1 and radio station 2, which provides options to automate playing of the stations when the consumers arrive home, or when they start their daily routine for work (e.g., Monday through Friday). The system 900 is also configured to provide for exceptions to pre-determined schedules by employing readily available geographic and federal holiday information.

FIGS. 11A and 11B are example user interfaces for managing operational profiles, in accordance with some implementations.

In particular, FIG. 11A illustrates one example of a simplified user interface 1100 according to the present invention. The user interface 1100 may be displayed on the mobile device 906. The user interface 1100 shows that the system 900 has learned that when consumer Amy leaves, she turns off music and locks the doors. This option is displayed by the system 900 for selection. The user interface 1100 also indicates that the system 900 has learned that at 11:00 PM lights and music are turned off. This option is also provided for selection by the consumer. The user interface 1100 further shows that at 8:00 AM, both thermostat and music are turned on, and this option is also provided for selection. Accordingly, by learning a consumer's typical daily activities, the system 900 according to the present invention enables a very simple and straightforward configuration user interface 1100 to be provided, as opposed to an interface that would otherwise provide options for every feature offered by a configuration of wireless home automation devices.

In another example, consider a configuration where sound sensors are placed throughout a home. The system 900 would thus collect information from the sensors about consumers and their respective locations in the home, and which consumer has what kind of footsteps—all based on sound attributes of recognized activity that is detected by the sound sensors. The system 900 may learn what room the consumers are in and how many are in the room. The system may also determine if the consumers are asleep in bed, or that they having a party downstairs. In this example implementation BLUETOOTH LOW ENERGY sensors and/or !BEACONS® disposed as devices 902 within the system 900 to enable the system 900 to learn consumers' locations inside the home, as is discussed above.

Data is collected from the devices 902 and the learning algorithms within the system 900 employ this data to generate device usage correlations in order to develop user-friendly interfaces 1100 for configuration of the system 900. The state of each connected device 902 in the home is also employed by the algorithms. For example, the system 900 may learn which consumers are turning lights on and off and at what times and days of the week. As noted above, the system 900 also utilizes data available via cloud services (e.g., federal holidays, weather forecasts, etc.), along with consumer locations to enable more adaptive learning of device usage.

In one implementation, after the system 900 has collected a sufficient amount of learning data, approximately two weeks of data, then the system 900 will start to control the devices 902 automatically. In this implementation, notifications may be pushed to the mobile device 906 such as, "I've noticed you usually turn on the music weekdays at 7 AM. Would you like me to automate this?" If the user selects to automate this feature, the system 900 enters the feature into the permanent configuration.

FIG. 11B illustrates an example user interface for correcting non-optimally defined or mismatched patterns. FIG. 11B depicts a corrective interface 1102 for display on the mobile device 906 that provides selective options for the user to indicate which device (or all devices) is not functioning according to the consumer's intended usage. In this example, the devices/rooms whose behavior pursuant to an automated program might not be optimal include rooms/zones, such as the front porch, bedroom frontdoor, Sonos sound system 1, or all of the above. Thus, the consumer is presented with a display on their mobile device 906 that allows them to correct the system's understanding of which usage pattern should be employed.

Even though the system 900 according to the present invention allows for predictive automation of devices 902 within a facility, some consumers may want to manage operational profiles (e.g., profiles automatically generated by the system 900 based on observed and predicted usage patterns) by exception. Accordingly, in some implementations the system 900 provides advance indications to the user that automated features are about to occur/be triggered. For example, in some implementations used to automatically control lighting, one such indication to the user might involve the system 900 slowly turning down the lights in a particular room a few minutes turning them off exactly at a programmed "off" time. Advantageously, as a result, the consumer is notified that the system 900 is about to perform a predetermined action. A notification of this pending action may be provided to the mobile device, and if the consumer disagrees with the pending action he/she will select, for example "Not now," which preempts the pending action. In another implementation, when the consumer takes a manual action (e.g., increasing the temperature, turning the sound system off, turning the lights back on, etc.) to counteract a predetermined automatic action, the system 900 will take this manual action as an indication that the automatic action should not be implemented.

This present invention provides a superior technique for programming a system of home automation devices. By learning typical usage patterns over a period of time, very simple programming mechanisms are provided to the end user, thus lowering the bar for automation products to enter the mass market. Full feature programmability within end devices is not required. Rather than forcing the average consumer to program complex usage functions, the system 900 according to the present invention offers simplicity and convenience.

FIGS. 12A-12G are flow diagrams illustrating methods 1200 (FIGS. 12A-12C), 1250 (FIG. 12D), 1260 (FIG. 12E), 1270 (FIG. 12F), and 1280 (FIG. 12G) of generating and operating devices in accordance with operational profiles, in accordance with some implementations. In some implementations, the methods are performed by one or more electronic devices of a system (e.g., devices 102, 104, 106, 108, 110, 112, 114, 116 and/or 118 of smart home environment 100, FIG. 1; devices 204 and/or hub 180 of smart home network 202, FIG. 2; wireless end devices 902 and/or hub 901 of the home automation system 900, FIG. 9). In some implementations, the methods are performed in part by one or more electronic devices (e.g., devices of smart home environment 100, FIG. 1; devices 204 and/or hub 180 of smart home network 202, FIG. 2; wireless end devices 902 and/or hub 901 of home automation system 900, FIG. 9) and in part by a server device (e.g., smart home provider server system 164 of FIG. 1 and FIG. 2; accounts database cloud 904 and/or realtime cloud 903 of FIG. 9). In some implementations, the methods are performed by a server device (e.g., smart home provider server system 164 of FIG. 1 and FIG. 2; accounts database cloud 904 and/or realtime cloud 903 of FIG. 9). Thus, in some implementations, each of the steps of the methods described herein are entirely interchangeable, some of which may be performed by one or more electronic devices and/or a hub device of a system, and/or a server device. For ease of reference, the methods herein will be described as being performed by a system. However, it will be understood that, in various implementations, respective operations of the methods are performed by any of the aforementioned devices or combination of devices. FIGS.

12A-12G correspond to instructions stored in a computer memory or other computer-readable storage medium (e.g., memory 606 of hub 180, memory 706 of server system 508, and/or memory 806 of client device 504).

The method 1200 is performed at a system (e.g., home automation system 900, FIG. 9) having a plurality of electronic devices (e.g., wireless end devices 902 and/or hub 901), at least one of the plurality of electronic devices having one or more processors and memory storing instructions for execution by the one or more processors (1202).

Usage information of one or more of a plurality of electronic devices is collected (1204) for a plurality of known users within a premise. As noted with respect to FIG. 9, various mechanisms may be employed to distinguish between usage information of different users (e.g., smart phones, geofencing, etc.).

In some implementations, collecting usage information includes detecting (1206) use of the one or more electronic devices. In some implementations, detecting use includes detecting (1208) an active or inactive state of the electronic devices. For example, an active state corresponds to the electronic device being turned ON (e.g., turning on bathroom lights), and an inactive state corresponds to the electronic device being turned OFF. Alternatively, an active state corresponds to the detection of recent activity by the electronic device (e.g., a setting of the electronic device was recently adjusted by a user), while an inactive state corresponds to the lack of recent activity by the electronic device (e.g., the device is idle).

In some implementations, detecting use includes identifying (1210) one or more current settings of the electronic devices. For example, as described with respect to FIG. 9, the system identifies that a user listens to IHEARTRADIO station entitled "Kaskade" on the user's sound system (e.g., a wireless end device 902, FIG. 9) as the user begins his daily routine for work.

In some implementations, detecting use includes detecting (1212) a change in one or more settings of at least one of the one or more electronic devices (e.g., turning light from OFF to ON).

In some implementations, collecting usage information includes determining (1214) the date and/or times at which use of the one or more electronic devices was detected. Referring to the example provided with respect to FIG. 11A, the system determines that at 8:00 AM, the thermostat and music sound system are turned ON.

In some implementations, collecting usage information includes determining (1216) a sequence with which the one or more electronic devices were operated. For example, as described with respect to FIG. 9, the system determines that the user turns on bathroom lights at 7:00 AM, and subsequently turns on a sound system 10 minutes later.

In some implementations, collecting usage information includes determining (1218) one or more locations of the first user at the times at which use of the one or more electronic devices was detected. Continuing the example above, the system detects that after turning on the sound system 10 minutes after turning on the bathroom lights at 7:00 AM, an occupancy sensor (e.g., a wireless end device 902, FIG. 9) detects that the user enters the kitchen and subsequently turns the lights on. Thus, this usage information identifies both the bathroom and the kitchen as areas in which the devices are used.

The system then identifies (1220), for a first user of the plurality of known users, a usage pattern of the one or more electronic devices based on the collected usage information. For example, referring to one of the examples described with respect to FIG. 11A, the system identifies a pattern in which the user turns off lights and a sound system at 11:00 PM. In some implementations, the usage pattern corresponds (1222) to use of the one or more electronic devices by the first user over a predefined period of time (e.g., usage information collected over the course of a month).

Figure 12A:
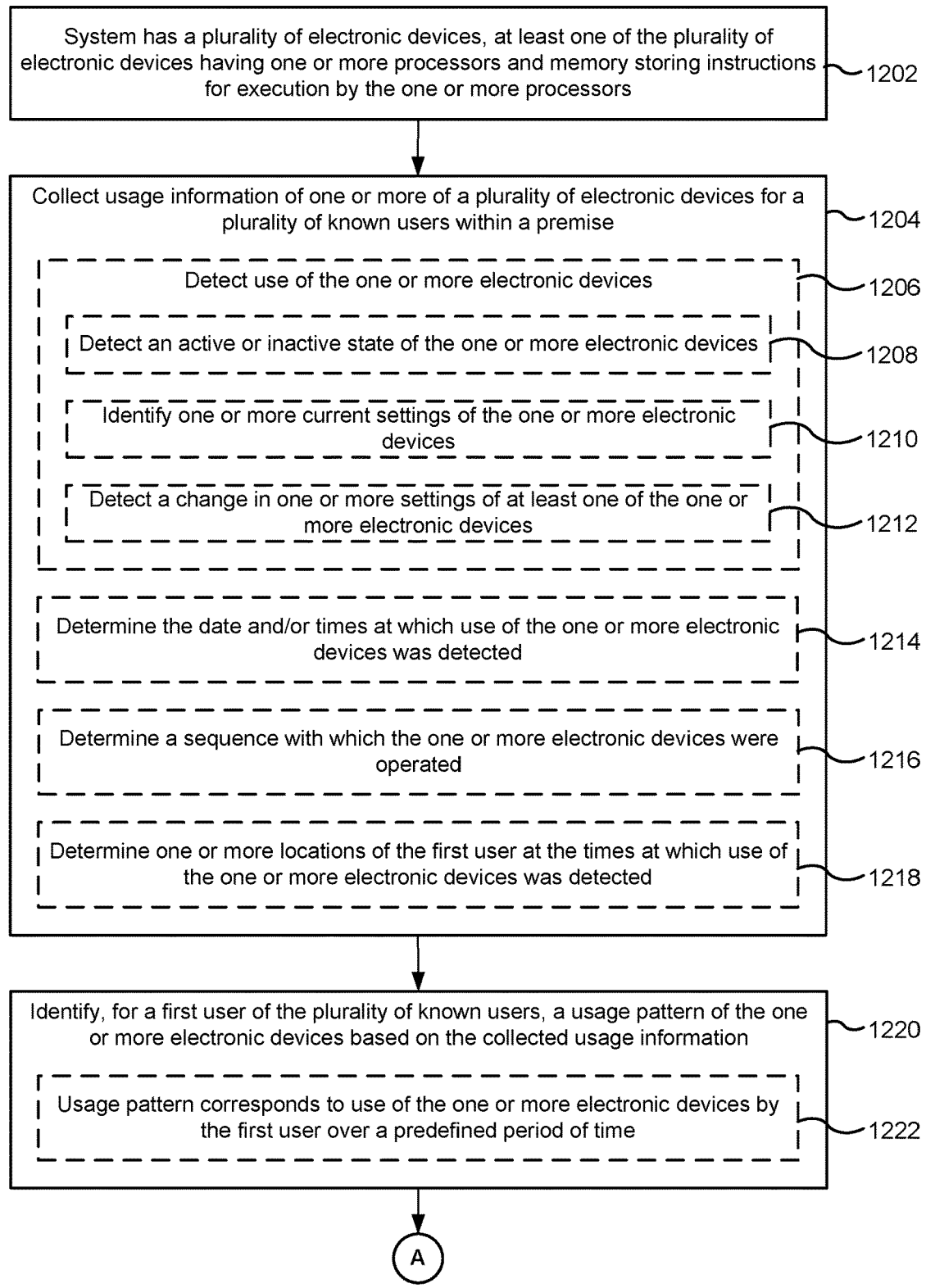
FIGS. 12A-12G are flow diagrams illustrating a method of generating and operating devices in accordance with operational profiles, in accordance with some implementations.
Figure 12B:
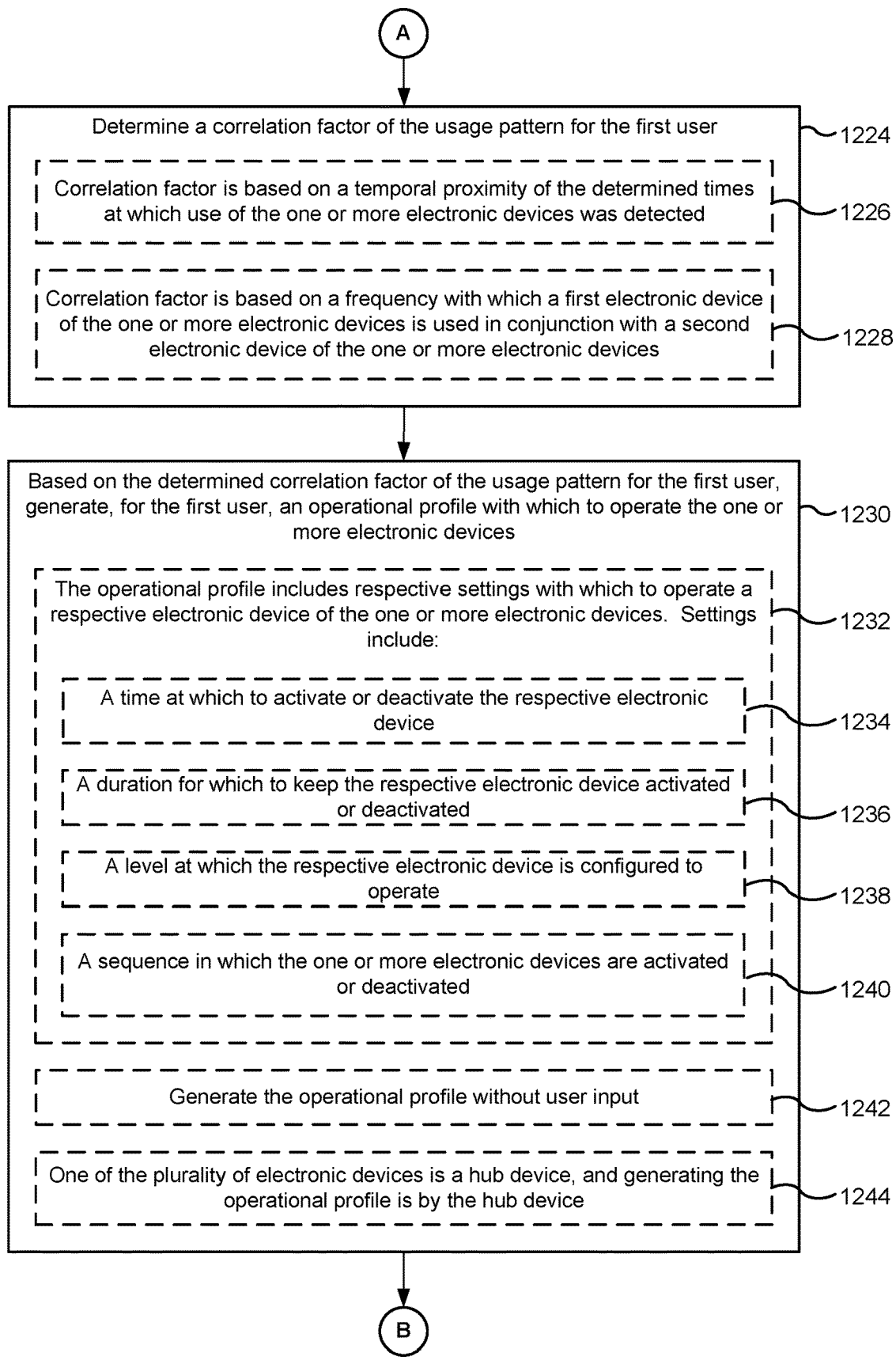

Referring now to FIG. 12B, the system then determines (1224) a correlation factor of the usage pattern for the first user. The correlation factor indicates the degree to which the use of multiple electronic devices is correlated, and thus corresponds to a likelihood that the user is exhibiting a usage pattern of such devices.

In some implementations, the correlation factor is based on a temporal proximity (1226) of the determined times at which use of the one or more electronic devices was detected. Temporal proximity may include an amount of time within which multiple devices are operated simultaneously (e.g., device operations occurring more closely to each other being assigned a higher correlation factor). Referring again to the example described with respect to FIG. 9, the system determines that the user turns on bathroom lights at 7:00 AM, then turns on a sound system 10 minutes later, and moments later turns on the kitchen lights. Accordingly, the use of these devices within approximately 10 minutes of each another would be assigned a higher correlation factor than the same use occurring more than 10 minutes of each other. As another example, referring to FIG. 10, because the actions of turning lights on and turning a sound system occur closely to each other, a high correlation factor is assigned to the pair of actions. In another example, because a separate event ("Other event") occurs further in time from any other action (e.g., turning sound system on, turning lights off), a low correlation factor is assigned.

In some implementations, the correlation factor is based on a frequency (1228) with which a first electronic device of the one or more electronic devices is used in conjunction with a second electronic device of the one or more electronic devices (e.g., if toaster device and coffee maker device are frequently operated together, then high correlation factor assigned).

Based on the determined correlation factor of the usage pattern for the first user, the system generates (1230), for the first user, an operational profile with which to operate the one or more electronic devices. In some implementations, the operational profile includes (1232) respective settings with which to operate a respective electronic device of the one or more electronic devices. Settings may include: a time (1234) at which to activate or deactivate the respective electronic device (e.g., referring to FIG. 11A, turn on thermostat and music at 8:00 AM), a duration (1236) for which to keep the respective electronic device activated or deactivated (e.g., turn on devices for an hour), a level (1238) at which the respective electronic device is configured to operate (e.g., device setting selected from a range of incremental settings, such as low, medium, and high), and/or a sequence (1240) in which the one or more electronic devices are activated or deactivated (e.g., as described with respect to FIG. 9, the user first turns on bathroom lights at 7:00 AM, and subsequently turns on a sound system 10 minutes later).

In some implementations, the system generates (1242) the operational profile without user input (e.g., automatically, without additional confirmation from the user). In some implementations, one of the plurality of electronic devices is a hub device (e.g., hub 901, FIG. 9), and generating the operational profile is by the hub device.

Figure 12C:
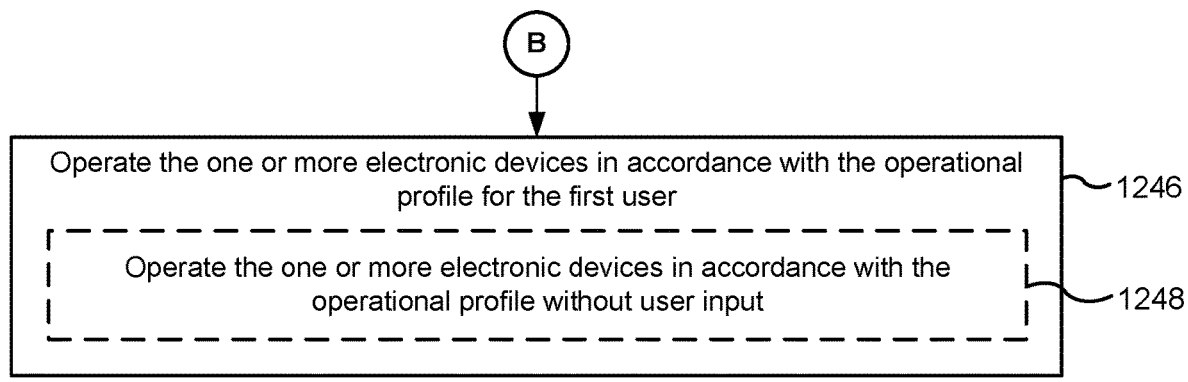

Referring now to FIG. 12C, the one or more electronic devices are operated (1246) in accordance with the operational profile for the first user (e.g., in accordance with respective settings of the operational profile, generated in step 1230, FIG. 12B). In some implementations, the one or more electronic devices are operated (1248) in accordance with the operational profile without user input (e.g., automatically, without additional confirmation from the user).

Figure 12D:
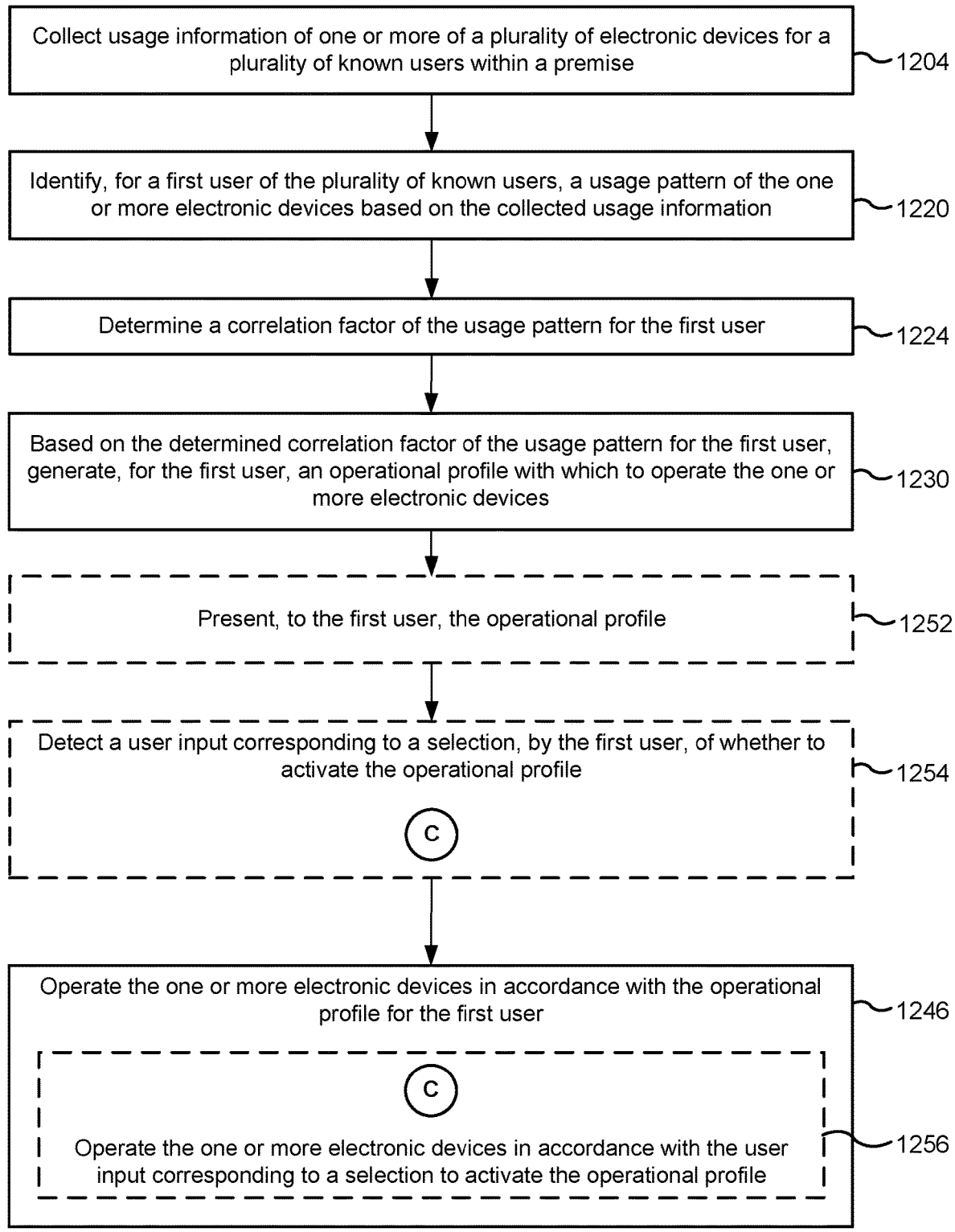

Referring now to FIG. 12D, in performing the method 1250, the system collects (1204) usage information of one or more of a plurality of electronic devices for a plurality of known users within a premise, and identifies (1220), for a first user of the known users, a usage pattern of the one or more electronic devices based on the collected usage information. A correlation factor of the usage pattern for the first user is determined (1224), and based on the determined correlation factor of the usage pattern for the first user, an operational profile for the first user is generated (1230). These operations (steps 1204, 1220, 1224, and 1230) are performed in accordance with any of the implementations discussed above with respect to the method 1200.

In some implementations, the system then presents (1252), to the first user, the operational profile. For example, as shown in FIG. 11A, the mobile device 906 displays a configuration user interface 1100, which includes a list of patterns the hub (e.g., hub 901, FIG. 9) has already identified (e.g., at 11:00 PM, lights are turned off and the sound system is turned off). After presenting the operational profile, the system then detects (1254) a user input corresponding to a selection, by the first user, of whether to activate the operational profile.

Accordingly, operating (1246) the one or more electronic devices in accordance with the operational profile (performed in accordance with any of the implementations discussed above with respect to the method 1200), is further performed in accordance with the user input (1256) corresponding to a selection to activate the operational profile. In other words, in some implementations, the system first requires authorization from the user to implement the operational profile.

In some implementations, presenting the operational profile (step 1252) and detecting the user input (step 1256) occur after operation of the electronic devices in accordance with the operational profile has begun (step 1246). Alternatively, steps 1252 and 1256 occur in response to generating the operational profile (step 1230).

Figure 12E:
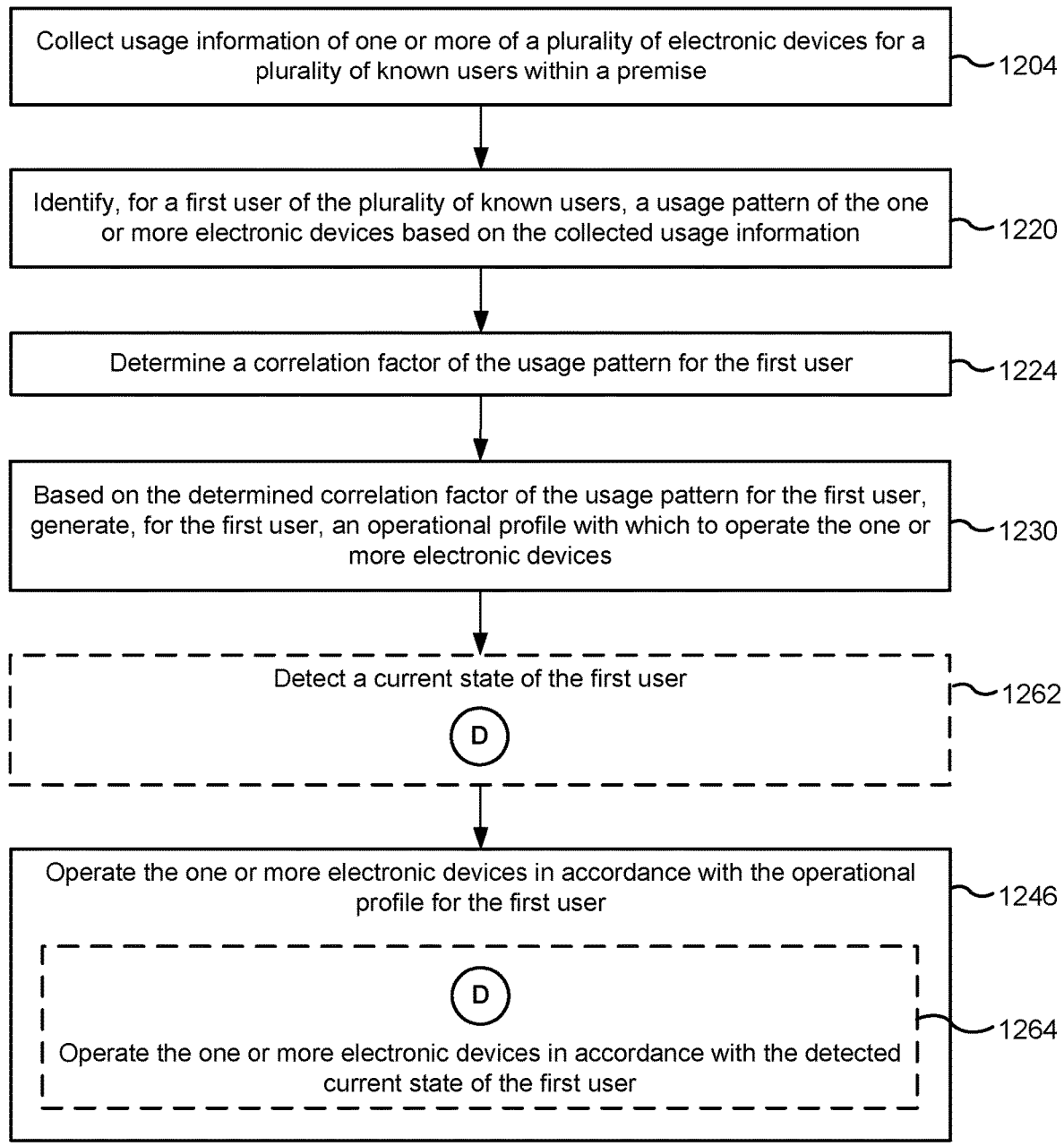

Referring now to FIG. 12E, in performing the method 1260, the system collects (1204) usage information of one or more of a plurality of electronic devices for a plurality of known users within a premise, and identifies (1220), for a first user of the known users, a usage pattern of the one or more electronic devices based on the collected usage information. A correlation factor of the usage pattern for the first user is determined (1224), and based on the determined correlation factor of the usage pattern for the first user, an operational profile for the first user is generated (1230). These operations (steps 1204, 1220, 1224, and 1230) are performed in accordance with any of the implementations discussed above with respect to the method 1200.

In some implementations, the system then detects (1262) a current state of the first user. Various examples of a user's state are described with respect to FIG. 11A (e.g., what room the user is in, which user is detected, whether user is asleep or active, etc.).

Accordingly, operating (1246) the one or more electronic devices in accordance with the operational profile (performed in accordance with any of the implementations discussed above with respect to the method 1200), is further performed in accordance with the detected current state (1264) of the first user. Thus, for example, the operational profile will only be implemented if the user is awake, or detected in a particular room of the premise. Optionally, operating electronic devices is based on which user is detected (e.g., an operational profile for a first user will be implemented if the presence of the first user is detected, but not if the presence of a second user is detected).

Figure 12F:
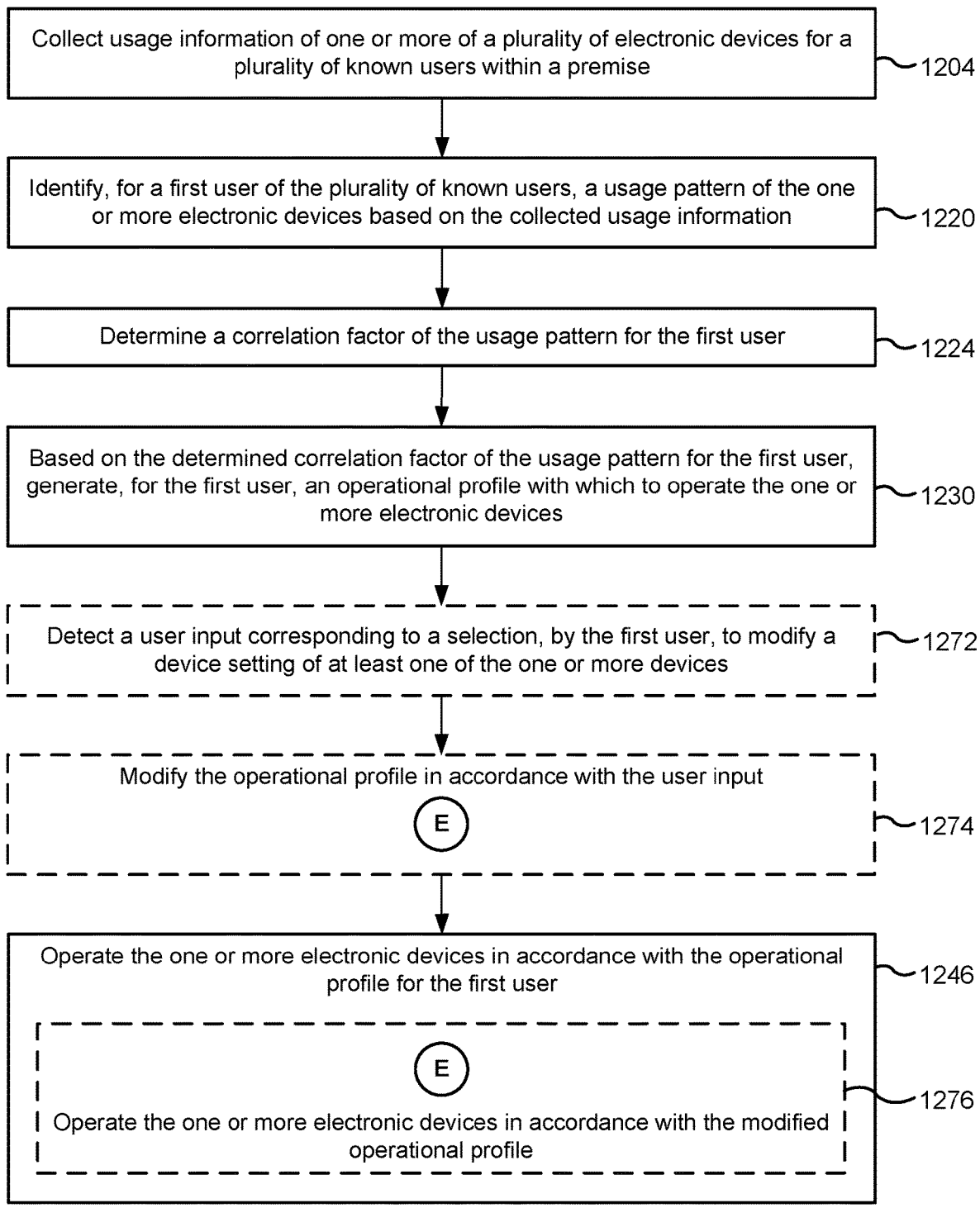

Referring now to FIG. 12F, in performing the method 1270, the system collects (1204) usage information of one or more of a plurality of electronic devices for a plurality of known users within a premise, and identifies (1220), for a first user of the known users, a usage pattern of the one or more electronic devices based on the collected usage information. A correlation factor of the usage pattern for the first user is determined (1224), and based on the determined correlation factor of the usage pattern for the first user, an operational profile for the first user is generated (1230). These operations (steps 1204, 1220, 1224, and 1230) are performed in accordance with any of the implementations discussed above with respect to the method 1200.

In some implementations, a user input is detected (1272) corresponding to a selection, by the first user, to modify a device setting of at least one of the one or more devices. The system then modifies (1274) the operational profile in accordance with the user input. A selection to modify a device setting may include a selection to modify an operational profile (e.g., in FIG. 11A, modifying the operational profile at 11:00 PM to turn the music ON, instead of OFF).

Accordingly, operating (1246) the one or more electronic devices in accordance with the operational profile (performed in accordance with any of the implementations discussed above with respect to the method 1200), is further performed in accordance with the modified operational profile (1276). Continuing the example above, at 11:00 PM, the system will turn the music ON (as set by the modified operational profile) rather than turn the music OFF.

In some implementations, detecting the user input (step 1272) and modifying the operational profile (step 1274) are in response to generating the operational profile (step 123). In some implementations, a user is presented with a corrective user interface (e.g., corrective user interface 1102, FIG. 11B) for identifying devices that are not working according to the user's intended usage. The corrective user interface 1102 includes, for example, a list of the one or more electronic devices (e.g., front porch lights, bedroom lights, etc.), and optionally displays a state and/or settings of the device which the user may adjust.

Figure 12G:
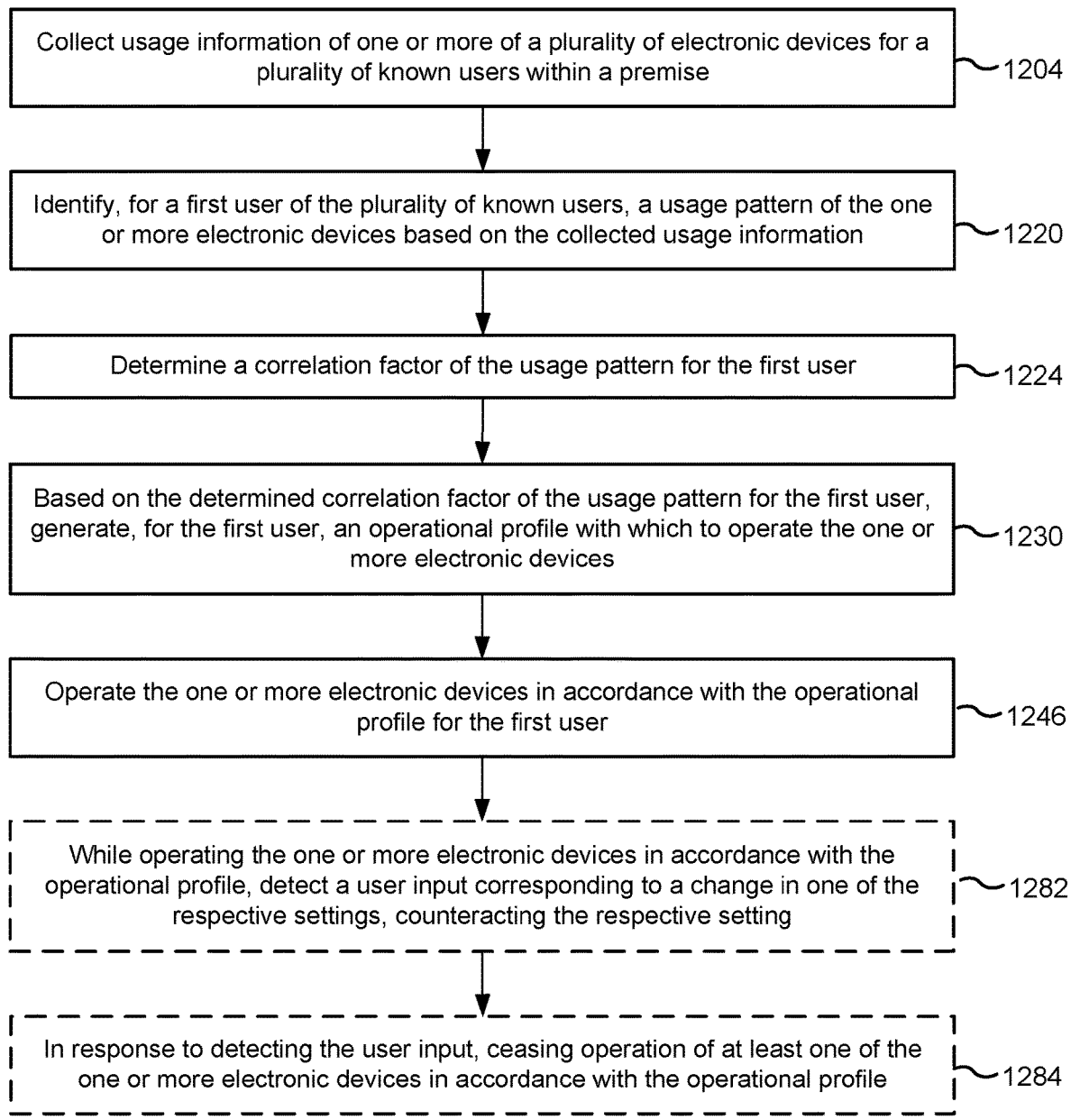

Referring now to FIG. 12G, in performing the method 1280, the system collects (1204) usage information of one or more of a plurality of electronic devices for a plurality of known users within a premise, and identifies (1220), for a first user of the known users, a usage pattern of the one or more electronic devices based on the collected usage information. A correlation factor of the usage pattern for the first user is determined (1224), and based on the determined correlation factor of the usage pattern for the first user, an operational profile for the first user is generated (1230). Accordingly, the one or more electronic devices are operated (1246) in accordance with the operational profile. These operations (steps 1204, 1220, 1224, 1230, and 1246) are performed in accordance with any of the implementations discussed above with respect to the method 1200.

While operating the one or more electronic devices in accordance with the operational profile, a user input is detected (1282) corresponding to a change in one of the respective settings, counteracting the respective setting. As described in a previous example, a user may, for instance, turn the light back on after the system automatically dims the lights in accordance with a generated operational profile.

In response to detecting the user input, operation of at least one of the one or more electronic devices is ceased (1284) in accordance with the operational profile. Thus, continuing the example above, if the user turns the lights back on after (or as) they are automatically dimmed, the system will override the operational profile. In some implementations, ceasing operation includes ceasing operation of each of the one or more electronic devices in accordance with the operational profile (i.e., entire operational profile is not implemented), while in other implementations, only the electronic device to which the counteracting user input corresponds will cease operating in accordance with the operational profile (e.g., in the example above, only the light will be affected).

In some implementations, the one or more electronic devices are operated in accordance with a current set of device settings. After generating the operational profile (step 1230) and before operating the one or more electronic devices in accordance with the operational profile (step 1246), a user input is detected that corresponds to a selection, by the first user, to withhold operating the one or more electronic devices in accordance with the operational profile. For example, the user is given the option (e.g., displayed on a user interface) to select "Not now" to decline using the operational profile. In some implementations, the user input is received at the hub (e.g., hub 901, FIG. 9). Additionally and/or alternatively, the user input is received at a mobile device (e.g., mobile device 906, FIG. 9). Accordingly, in response to detecting the user input, the system continues to operate the one or more electronic devices in accordance with the current set of device settings and withholds operation of the one or more electronic devices in accordance with the operational profile. In other words, the user may decline to operate the devices in accordance with the operational profile, and the system withholds from implementing the operational profile until authorization is received.

In some implementations, the operations 1204, 1220, 1224, 1230, and 1246 are performed for a second user of the plurality of known users. That is, an operational profile is generated for the second user, and the one or more electronic devices are operated in accordance with the operational profile for the second user. In some implementations, the operational profile for the second user is distinct from the operational profile for the first user, with respect to at least one of the one or more electronic devices.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at a system having a plurality of electronic devices, the system having one or more processors and memory storing instructions for execution by the one or more processors:
   determining a usage pattern of the plurality of electronic devices for each of a plurality of known users within a premise; and
   for each of a plurality of first users of the plurality of known users:
   determining a correlation factor of the usage pattern for the first user, wherein the correlation factor includes a state of a plurality of states of the first user including an activity of the first user, and the correlation factor indicates a degree to which uses of the plurality of electronic devices are correlated with the state of the first user;
   in accordance with the determination of the correlation factor of the usage pattern for the first user:
   generating, for the first user, an operational profile for operating the plurality of electronic devices; and
   causing operation of the plurality of electronic devices in accordance with the operational profile for the first user.

2. The method of claim 1, wherein the operational profile includes respective settings to operate a respective electronic device of the plurality of electronic devices.

3. The method of claim 2, wherein the respective settings include at least one of: a time at which to activate or deactivate the respective electronic device, a duration for which to keep the respective electronic device activated or deactivated, a level at which the respective electronic device is configured to operate, and a sequence in which the plurality of electronic devices is activated or deactivated.

4. The method of claim 1, wherein the operational profile includes respective settings to operate a respective electronic device of the plurality of electronic devices, the method further comprising:
   while causing operation of the plurality of electronic devices in accordance with the operational profile, detecting a user input corresponding to a change in one of the respective settings, counteracting the respective setting; and
   in response to detecting the user input, ceasing operation of at least one of the plurality of electronic devices in accordance with the operational profile.

5. The method of claim 1, wherein the usage pattern corresponds to use of the plurality of electronic devices by the first user over a predefined period of time.

6. The method of claim 1, wherein generating the operational profile and causing operation of the plurality of electronic devices in accordance with the operational profile are without user input.

7. A system, comprising:
a plurality of electronic devices, wherein the system has one or more processors and memory storing one or more programs for execution by the processor, the one or more programs including instructions for:
determining a usage pattern of the plurality of electronic devices for each of a plurality of known users within a premise; and
for each of a plurality of first users of the plurality of known users:
determining a correlation factor of the usage pattern for the first user, wherein the correlation factor includes a state of a plurality of states of the first user including an activity of the first user, and the correlation factor indicates a degree to which uses of the plurality of electronic devices are correlated with the state of the first user;
in accordance with the determination of the correlation factor of the usage pattern for the first user:
generating, for the first user, an operational profile for operating the plurality of electronic devices; and
causing operation of the plurality of electronic devices in accordance with the operational profile for the first user.

8. The system of claim 7, further comprising instructions for:
detecting a current state of the first user, wherein the current state of the first user comprises a work schedule of the first user; and
wherein causing operation of the plurality of electronic devices is further in accordance with the detected current state of the first user.

9. The system of claim 7, further comprising instructions for:
detecting a current state of the first user, wherein the current state of the first user comprises a current location within the premise of the first user; and
wherein causing operation of the plurality of electronic devices is further in accordance with the detected current state of the first user.

10. The system of claim 7, wherein the instructions for determining the correlation factor includes instructions for determining a proximity of time at which usage of the plurality of electronic devices is detected.

11. The system of claim 7, wherein one of the plurality of electronic devices is a hub device, and wherein generating the operational profile is by the hub device.

12. The system of claim 7, further comprising instructions for:
after generating the operational profile:
presenting, to the first user, the operational profile; and
detecting a user input corresponding to a selection, by the first user, of whether to activate the operational profile,
wherein causing operation of the plurality of electronic devices is in accordance with the user input corresponding to a selection to activate the operational profile.

13. The system of claim 7, further comprising instructions for:
after generating the operational profile:
detecting a user input corresponding to a selection, by the first user, to modify a device setting of at least one of the plurality of devices;
modifying the operational profile in accordance with the user input; and
causing operation of the plurality of electronic devices in accordance with the modified operational profile.

14. A non-transitory computer readable storage medium, storing one or more programs for execution by one or more processors of a system including a plurality of electronic devices, the one or more programs including instructions for:
determining a usage pattern of the plurality of electronic devices for each of a plurality of known users within a premise; and
for each of a plurality of first users of the plurality of known users:
determining a correlation factor of the usage pattern for the first user, wherein the correlation factor includes a state of a plurality of states of the first user including an activity of the first user, and the correlation factor indicates a degree to which uses of the plurality of electronic devices are correlated with the state of the first user;
in accordance with the determination of the correlation factor of the usage pattern for the first user:
generating, for the first user, an operational profile for operating the plurality of electronic devices; and
causing operation of the plurality of electronic devices in accordance with the operational profile for the first user.

15. The non-transitory computer readable storage medium of claim 14, wherein the instructions for determining the usage pattern includes instructions for at least one of:
detecting use of the plurality of electronic devices;
determining dates and/or times at which use of the plurality of electronic devices was detected;
determining a sequence with which the plurality of electronic devices was operated; and
determining one or more locations of the first user at the times at which use of the plurality of electronic devices was detected.

16. The non-transitory computer readable storage medium of claim 15, wherein the instructions for detecting use of the plurality of electronic devices includes instructions for detecting an active or inactive state of the plurality of electronic devices.

17. The non-transitory computer readable storage medium of claim 15, where the instructions for detecting use of the plurality of electronic devices includes instructions for identifying one or more current settings of the plurality of electronic devices.

18. The non-transitory computer readable storage medium of claim 15, wherein the instructions for detecting use of the plurality of electronic devices includes instructions for detecting a change in one or more settings of at least one of the plurality of electronic devices.

19. The non-transitory computer readable storage medium of claim 15, wherein the correlation factor is based on a temporal proximity of the determined times at which use of the plurality of electronic devices was detected.

20. The non-transitory computer readable storage medium of claim 15, wherein the correlation factor is based on a frequency with which a first electronic device of the plurality of electronic devices is used in conjunction with a second electronic device of the plurality of electronic devices.

\* \* \* \* \*